US011084909B2

(12) United States Patent
Zhou et al.

(10) Patent No.: US 11,084,909 B2
(45) Date of Patent: Aug. 10, 2021

(54) LIQUID ANTIOXIDANT COMPOSITION FOR RAW RUBBERS

(71) Applicant: BASF SE, Ludwigshafen am Rhein (DE)

(72) Inventors: Yi Qiong Zhou, Shanghai (CN); Chang Liang Fan, Shanghai (CN); Guo Liang Yuan, Shanghai (CN); Zhong Yi Zhou, Shanghai (CN)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 16/328,947

(22) PCT Filed: Aug. 21, 2017

(86) PCT No.: PCT/EP2017/070996
§ 371 (c)(1),
(2) Date: Feb. 27, 2019

(87) PCT Pub. No.: WO2018/041649
PCT Pub. Date: Mar. 8, 2018

(65) Prior Publication Data

US 2019/0194402 A1 Jun. 27, 2019

(30) Foreign Application Priority Data

Aug. 30, 2016 (WO) ................ PCT/CN2016/097315

(51) Int. Cl.

| | |
|---|---|
| ***C08J 3/215*** | (2006.01) |
| ***C08K 5/00*** | (2006.01) |
| ***C08K 5/13*** | (2006.01) |
| ***C08L 7/00*** | (2006.01) |
| ***C08L 21/00*** | (2006.01) |
| ***C08L 91/00*** | (2006.01) |
| ***C08L 9/00*** | (2006.01) |
| ***C08K 5/10*** | (2006.01) |
| ***C08K 5/18*** | (2006.01) |
| ***C08K 5/524*** | (2006.01) |
| *C08K 5/17* | (2006.01) |
| *C08K 5/49* | (2006.01) |

(52) U.S. Cl.
CPC ............... *C08J 3/215* (2013.01); *C08K 5/005* (2013.01); *C08K 5/10* (2013.01); *C08K 5/13* (2013.01); *C08K 5/18* (2013.01); *C08K 5/524* (2013.01); *C08L 7/00* (2013.01); *C08L 9/00* (2013.01); *C08L 21/00* (2013.01); *C08L 91/00* (2013.01); *C08J 2307/00* (2013.01); *C08J 2309/00* (2013.01); *C08J 2309/06* (2013.01); *C08J 2321/00* (2013.01); *C08K 5/17* (2013.01); *C08K 5/49* (2013.01); *C08K 2201/014* (2013.01)

(58) Field of Classification Search
CPC .... C08J 3/215; C08J 2309/06; C08J 2321/00; C08J 2307/00; C08K 5/005; C08K 5/18; C08K 5/524; C08K 5/13; C08K 5/10; C08L 21/00; C08L 7/00
USPC .......................................................... 524/147
See application file for complete search history.

(56) References Cited

U.S. PATENT DOCUMENTS

| | | | |
|---|---|---|---|
| 4,659,754 | A | 4/1987 | Edwards et al. |
| 6,569,927 | B1 | 5/2003 | Gelbin |

FOREIGN PATENT DOCUMENTS

| | | | | | |
|---|---|---|---|---|---|
| CN | 103435956 | A | | 12/2013 | |
| EP | 0 232 592 | A1 | | 8/1987 | |
| GB | 1077455 | | | 7/1967 | |
| GB | 1077455 | A | * | 7/1967 | ............. C08J 3/212 |
| KR | 20120015529 | | * | 2/2012 | |
| RU | 2 375 416 | | | 12/2009 | |
| WO | 97/14678 | | | 4/1997 | |
| WO | WO 2010/003813 | A1 | | 1/2010 | |

OTHER PUBLICATIONS

Translation of KR 2012-0015529, dated Feb. 22, 2012. (Year: 2012).*
International Search Report dated Oct. 26, 2017 in PCT/EP2017/070996 filed on Aug. 21, 2017.

* cited by examiner

*Primary Examiner* — Hui H Chin
(74) *Attorney, Agent, or Firm* — Grüneberg and Myers PLLC

(57) ABSTRACT

The present invention provides a liquid antioxidant composition used for raw rubbers comprising 5% to 30% by weight of at least one aromatic amine-based antioxidant agent, 20% to 70% by weight of at least one hindered phenol-based antioxidant agent, 0% to 40% by weight of at least one phosphite-based antioxidant agent; and 20% to 40% by weight of at least one solvent having boiling point higher than 185° C. and freezing point lower than −10° C. under 101.325 KPa, the weight percentage of component a), b), c) or d) is based on the total weight of antioxidant composition, wherein the mixture of component a), b) and c) is liquid at 25° C. under 101.325 KPa. The weight percentage is based on the total weight of antioxidant composition. The present invention further provides an application of said liquid antioxidant composition in raw rubbers such as natural rubber and raw rubbers synthesized via solution polymerization.

17 Claims, No Drawings

LIQUID ANTIOXIDANT COMPOSITION FOR RAW RUBBERS

TECHNICAL FIELD

The present invention relates to a liquid antioxidant composition and more specifically, it relates to a liquid antioxidant composition for raw rubber products.

BACKGROUND ART

Raw rubbers like natural rubbers, styrene-butadiene copolymers, polybutadiene, polyisoprene and so on are obtained from natural resources or solution polymerization of monomers undergoing processes of polymerization, evaporation, granulation and packaging but without vulcanization. Normally, antioxidants are added into rubbers at the end of polymerization to keep rubbers from coloration, gelation and deterioration of physical properties caused by oxidation during these processes as well as in storage. Before added into the raw rubber solution, antioxidants are dissolved in solvent of solution polymerization first to facilitate the even distribution of antioxidants in raw rubber solution.

Antioxidants agents often used in raw rubbers are hindered phenol-based agents. Phosphite-based antioxidant agents could be used together with hindered phenol-based antioxidant agents as auxiliary antioxidant to enhance anti-oxidation properties. Aromatic amine-based antioxidants agents have stronger anti-oxidation ability, but they tend to stain the raw rubbers. Limited amount of specific aromatic amine-based antioxidants could eliminate disadvantage of staining.

Among various hindered phenol-based, aromatic amine-based antioxidant agents and phosphite-based antioxidant, part of them are in solid at room temperature and therefore not applicable for production operation of raw rubbers. Even for antioxidant liquid at room temperature, there still exists problem, i.e., they tend to freeze at low temperature since their freezing point is normally higher than 15° C., which severely restricts the application in wide temperature range.

Patent application CN103435956A disclosed an antioxidant composition for SBS (block copolymer of styrene and butadiene) comprising 1 part of 4-hydroxyl-3,5-di-tertbutyl C7-C9 mixed alcohol ester of phenpropionate, 1.8 to 2.2 parts of 2-methyl-4,6-di-(octylsulfanylmethyl)phenol, 0.8 to 1.2 parts of reaction product of N-phenylphenylamine and 2,4,4-trimethylpentene. The obtained antioxidant composition is dissolved in cyclohexane first before added into SBS resin solution. And cyclohexane is the solvent of solution polymerization of SBS. The dissolving rate is low because of the polarity discrepancy between cyclohexane and antioxidant composition. Furthermore, cyclohexane has a boiling point of 80.74° C., which is lower than that of water. In "drying" step of preparing raw rubbers, i.e. removing solvent as well as monomer residue from rubber resins by hot water or steam, antioxidants tend to move into water, which brings a significant decrease of efficient antioxidants in raw rubbers. Moreover, the contaminated water requires further treatment to avoid polluting environment.

Therefore, it is still required to provide a new liquid antioxidant composition that is stable during "drying" process of rubber resins synthesized via solution polymerization, non-staining as well as applicable for wide temperature range besides sufficient anti-oxidation.

SUMMARY OF INVENTION

In one aspect, the present invention provides a liquid antioxidant composition used for raw rubbers, comprising a) 5% to 30% by weight of at least one aromatic amine-based antioxidant agent;

b) 20% to 70% by weight of at least one hindered phenol-based antioxidant agent;

c) 0% to 40% by weight of at least one phosphite-based antioxidant agent; and d) 20% to 40% by weight of at least one solvent having boiling point higher than 185° C. and freezing point lower than −10° C. under 101.325 KPa, the weight percentage of component a), b), c) or d) is based on the total weight of antioxidant composition, wherein the mixture of component a), b) and c) is liquid at 25° C. under 101.325 KPa.

In another aspect, the present invention provides a liquid antioxidant composition used for raw rubbers, comprising a) 5% to 20% by weight of solid aromatic amine-based antioxidant agent;

b) 20% to 50% by weight of solid hindered phenol-based antioxidant agent;

c) 0% to 30% by weight of solid phosphite-based antioxidant agent; and d) 30% to 40% by weight of solvent having boiling point higher than 185° C. and freezing point lower than −10° C. under 101.325 KPa, the weight percentage of component a), b), c) or d) is based on the total weight of antioxidant composition.

In another aspect, the present invention provides a use of said antioxidant composition in raw rubbers synthesized via solution polymerization or in natural rubbers.

In another aspect, the present invention provides a raw rubber product comprising said antioxidant composition.

In a further aspect, the present invention provides a process of using the invented antioxidant composition in raw rubbers synthesized via solution polymerization or natural rubbers comprising steps of i) dissolving component a), b) and c) into d); ii) diluting liquid antioxidant composition by solvent for solution polymerization of raw rubbers; iii) adding diluted liquid antioxidant composition into raw rubbers synthesized via solution polymerization or natural rubbers.

DETAILED DESCRIPTION OF INVENTION

Technical Problems

For rubber resins synthesized via solution polymerization, one significant step of process is to remove solvent and monomer residues from raw rubber solution by hot water or steam. During this step, antioxidant agents are prone to separate from rubber resins and dissolve into water, which in one side, leads to a loss of antioxidant agents in rubber resins and in another side contaminates water. The contaminated water needs to be treated to prevent environmental damages.

Part of antioxidant agents are liquid while the others are solid at around 25° C. The term "liquid" means the upper limit of melting range or melting point of an antioxidant agent without dissolving into any solvent is no more than 25° C. under 101.325 KPa. The term "solid" means the lower limit of melting range or melting point of an antioxidant agent without dissolving into any solvent is more than 25° C. under 101.325 KPa. The liquid antioxidant agents turn to freeze at temperature like 5° C., which severely limits the application in cold weather. Before added into the raw rubber solution, the antioxidant agents are dissolved in solvent of solution polymerization of rubber resin and the most often used solvent are hexane, cyclohexane, toluene and chlorobenzene etc. which have considerable polarity discrepancy from antioxidant agents. Such polarity discrepancy leads to slow dissolving speed of antioxidant agents into the solvent. Moreover, the solvents need to be removed during drying step and therefore the antioxidants will separate from rubber resins, which decrease the antioxidant efficiency dramatically.

Solution to Problems

The liquid antioxidant composition according to the present invention comprises: a) 5% to 30% by weight of at least one aromatic amine-based antioxidant agent; b) 20% to 70% by weight of at least one hindered phenol-based antioxidant agent; c) 0% to 40% by weight of at least one phosphite-based antioxidant agent; and d) 20% to 40% by weight of at least one solvent having boiling point higher than 185° C. and freezing point lower than −10° C. under 101.325 KPa, the weight percentage of component a), b), c) or d) is based on the total weight of antioxidant composition, wherein the mixture of component a), b) and c) is liquid at 25° C. under 101.325 KPa. Or the liquid antioxidant composition according to the present invention comprises: a) 5% to 20% by weight of solid aromatic amine-based antioxidant agent; b) 20% to 50% by weight of solid hindered phenol-based antioxidant agent; c) 0% to 30% by weight of solid phosphite-based antioxidant agent; and d) 30% to 40% by weight of solvent having boiling point higher than 185° C. and freezing point lower than −10° C. under 101.325 KPa, the weight percentage of component a), b), c) or d) is based on the total weight of antioxidant composition.

The crucial component for the present invention is the solvent having boiling point higher than 185° C. and freezing point lower than −10° C. under 101.325 KPa. To ensure that antioxidant agents do not move to water during drying step of production process of raw rubber, the solvent needs to meet at least three requirements: i). the antioxidant agent is easily dissolved in the solvent and hard to separate from the solvent; ii) the solvent has good compatibility with rubber resins and hard to separate from the rubber resins; iii) the boiling point of the solvent is substantially higher than 100° C. Furthermore, to make the antioxidant composition applicable for wide temperature range, the solvent needs to have a low freezing point.

Preferably, the solvent is one or more selected from linear or branched alkane having $C_9$ to $C_{30}$, arene having $C_6$ to $C_{18}$, cyclane having $C_{10}$ to $C_{30}$, linear saturated carboxylic acid having $C_8$ to $C_{18}$, branched saturated carboxylic acid having $C_8$ to $C_{12}$, linear saturated alcohol having $C_8$ to $C_{18}$ and branched saturated alcohol having $C_8$ to $C_{12}$, alkyl-substituted phosphonic acid having $C_6$ to $C_{12}$, saturated or unsaturated monobasic aromatic acid ester having Formula I:

Formula I

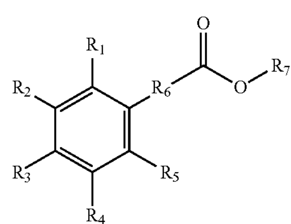

wherein, $R_1$ to $R_5$ are independently selected from hydrogen, saturated or unsaturated linear or branched alkyl groups having $C_1$ to $C_{15}$; $R_6$ is selected from saturated or unsaturated linear or branched alkylene groups having $C_1$ to $C_{15}$; $R_7$ is selected from saturated or unsaturated linear or branched alkyl groups having $C_1$ to $C_{15}$ or represents a covalent bond, and saturated or unsaturated dibasic aromatic acid ester having Formula II-(a) and/or Formula II-(b) and/or Formula II-(c):

Formula II-(a)

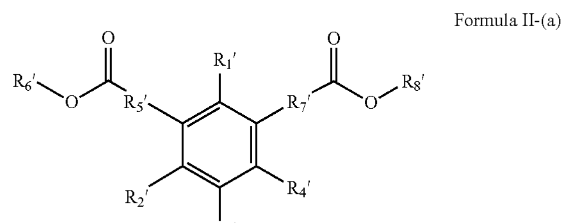

Formula II-(b)

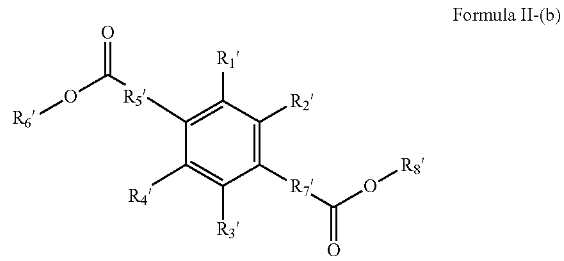

Formula II-(c)

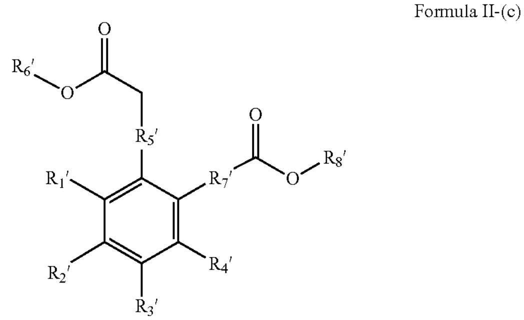

wherein, $R_1'$ to $R_4'$ are independently selected from hydrogen, saturated or unsaturated linear or branched alkyl groups having $C_1$ to $C_{15}$; $R_5'$ and $R_7'$ are independently selected from saturated or unsaturated linear or branched alkylene groups having $C_1$ to $C_{15}$ or represents a covalent bond; $R_6'$ and $R_8'$ are independently selected from saturated or unsaturated linear or branched alkyl groups having $C_1$ to $C_{15}$, and saturated or unsaturated tribasic aromatic acid ester having Formula III-(a) and/or Formula III-(b) and/or Formula III-(c):

Formula III-(a)

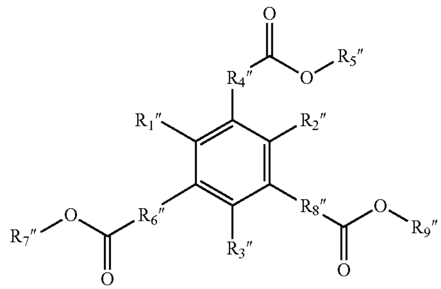

-continued

Formula III-(b)

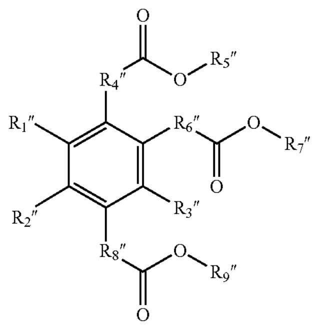

Formula III-(c)

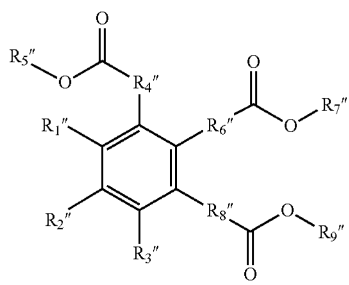

wherein, $R_1''$ to $R_3''$ are independently selected from hydrogen, saturated or unsaturated linear or branched alkyl groups having $C_1$ to $C_{15}$; $R_4''$, $R_6''$ and $R_8''$ are independently selected from saturated or unsaturated linear or branched alkylene groups having $C_1$ to $C_{15}$ or represents a covalent bond; $R_5''$, $R_7''$ and $R_9''$ are independently selected from saturated or unsaturated linear or branched alkyl groups having $C_1$ to $C_{15}$, and alkylated phosphate having Formula IV:

Formula IV

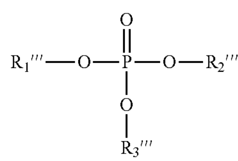

wherein, $R_1'''$ to $R_3'''$ are independently selected from hydrogen, saturated or unsaturated linear or branched alkyl groups having $C_1$ to $C_{15}$, and saturated or unsaturated monobasic carboxylic acid ester having Formula V:

Formula V

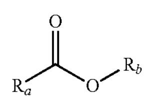

wherein, $R_a$ and $R_b$ are independently selected from saturated or unsaturated linear or branched alkyl groups having $C_1$ to $C_{15}$, and saturated or unsaturated dibasic carboxylic acid ester having Formula VI:

Formula VI

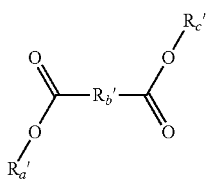

wherein, $R_a'$ and $R_c'$ are independently selected from saturated or unsaturated linear or branched alkyl groups having $C_1$ to $C_{15}$; $R_b'$ is selected from saturated or unsaturated linear or branched alkylene groups having $C_1$ to $C_{15}$, and saturated or unsaturated tribasic carboxylic acid ester having Formula VII:

Formula VII

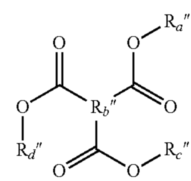

wherein, $R_a''$, $R_c''$ and $R_d''$ are independently selected from saturated or unsaturated linear or branched alkyl groups having $C_1$ to $C_{15}$; $R_b''$ is selected from saturated or unsaturated linear or branched alkylidene groups having $C_1$ to $C_{15}$.

More preferably, the solvent is one or more selected from hendecane, n-dodecane, 2-methylnonane, n-decane, benzene, toluene, ethylbenzene, propylbenzene, butylbenzene, pentylbenzene, hexylbenzene, heptylbenzene, octylbenzene, nonylbenzene, decylbenzene, undecylbenzene, dodecylbenzene, butylcyclohexane, pentylcyclohexane, hexylcyclohexane, heptylcyclohexane, octylcyclohexane, nonylcyclohexane, decylcyclohexane, undecylcyclohexane, dodecylcyclohexane, pentylcyclopentane, pentylcyclopentane, hexylcyclopentane, heptycyclopentane, octylcyclopentane, nonylcyclopentane, decylcyclopentane, undecylcyclopentane, dodecylclopentane, 2-ethylhexanoic acid, hexanoic acid, heptanoic acid, neodecanoic acid, isononanoic acid, neodecanoic acid, n-octyl alcohol, n-nonanol, n-decyl alcohol, n-undecanol, isooctyl alcohol, isononyl alcohol, isodecyl alcohol, methyl benzoate, ethyl benzoate, propyl benzoate, butyl benzoate, hexyl benzoate, diethyl phthalate, dipropyl phthalate, dibutyl phthalate, dipentyl phthalate, dihexyl phthalate, diheptyl phthalate, dioctyl phthalate, diisooctyl phthalate, dinonyl phthalate, diisononyl phthalate, didecyl phthalate, diisodecyl phthalate, trimethyl orthobenzoate, ethyl oleate, butyl oleate octyl acetate, decyl acetate, isononyl acetate, nonyl acetate, n-octyl propanoate, decyl propanoate, isononyl propanoate, nonyl propanoate, pentyl butanoate, hexyl butyrate, heptyl butanoate, n-octyl butanoate, butyl valerate, amyl valerate, hexyl valerate, butyl caproate, amyl caproate, hexyl hexanoate, ethyl heptanoate, propyl heptanoate, butyl heptoate, pentyl heptanoate, methyl octanoate, etheyl octanoate, propyl octanoate, butyl octanoate, amyl octanoate, hexyl octanoate, heptyl octanoate, octyl octanoate, nonyl octanoate, methyl nonanoate, ethyl nonanoate, isoamyl nonanoate, isononyl isononanoate, methyl caprate, ethyl caprate, propyl decanoate, butyl caprate, isoamyl decanoate, lauricacidisoamylester, ethylene glycol diacetate, ethylene glycol di-n-butyrate, dibutyl malonate, diethyl malonate, dihexyl malonate, diethyl succinate, dipropyl succinate, dibutyl succinate, dipentyl succinate, dimethyl glutarate, diethyl glutarate, diethyl adipate, diisopropyl adipate, diisobutyl adipate, di(2-ethylhexyl)adipate, dihexyl adipate, diisononyl adipate, diisodecyl adipate, dibutyl sebacate, bishexyl sebacate, bis(2-ethylhexyl) sebacate, dioctyl sebacate, diisooctyl sebacate, glyceryl triacetate, glyceryl tripropionate, glyceryl tributyrate, triisobutyl phosphate, triamyl phosphate, trihexyl phosphate and trioctyl phosphate.

Solvents selected from linear saturated acid having $C_8$ to $C_{18}$, branched saturated acid having $C_8$ to $C_{12}$, linear saturated alcohol having $C_8$ to $C_{18}$ and branched saturated alcohol having $C_8$ to $C_{12}$ bring a further advantage, that is, acids or alcohols take reaction with metal cations of Li, Ni, Co etc. which otherwise react with antioxidant agents. Examples of linear saturated acid having $C_8$ to $C_{18}$ are hexanoic acid and heptanoic acid and of branched saturated acid having $C_8$ to $C_{12}$ are 2-ethylhexanoic acid, isononanoic acid and neodecanoic acid. Examples of linear saturated alcohol having $C_8$ to $C_{18}$ is n-nonanol and of branched saturated alcohol having $C_8$ to $C_{12}$ is isodecyl alcohol and isooctyl alcohol.

Some natural or synthesized mixture of two or more selected from linear or branched alkane having $C_9$ to $C_{30}$, arene having $C_8$ to $C_{18}$, cyclane having $C_{10}$ to $C_{30}$ are also used as the solvent. Examples of said mixture are paraffin oil, naphthenic oil and arene oil.

The weight percentage of the solvent is from 20% to 40% by weight when the antioxidant agents of component a), b) and optional component c) are not solid simultaneously before dissolving into the solvent. If the content of solvent is less than 20%, component a), b) and optional component c) tend to have problem in dissolving and the resultant composition might not be homogeneous. However, if the content of solvent is more than 40%, the concentration of antioxidant agents tend to be too low to reach the requirements of anti-oxidation.

Aromatic amine-based antioxidant agents, hindered phenol-based antioxidant agents and optional phosphite-based antioxidant agents are mixed to use in present invention. When at least one type of these antioxidant agents is liquid, the weight percentage of solvent is from 20% to 40% and the weight percentage of aromatic amine-based, hindered phenol-based and phosphite-based antioxidant agents are from 5% to 30%, from 20% to 70% and from 0% to 40% respectively. When all of these antioxidant agents are solid, the weight percentage of solvent is from 30% to 40% and the weight percentage of aromatic amine-based, hindered phenol-based and phosphite-based antioxidant agents are from 5% to 20%, from 20% to 50% and from 0% to 30% respectively.

Aromatic amine-based antioxidant agents have outstanding antioxidant properties but are prone to stain the rubber resins. Since the raw rubbers products are required to be colorless or at least have very light color, not all types of aromatic amine-based antioxidant could be used and even for those applicable ones there exists limitation of amounts. The amount of aromatic amine-based antioxidant agents is from 5% to 30% by weight based on the total weight of the antioxidant composition. When the amount is lower than 5% by weight, the antioxidant capacity might be insufficient. However, when the amount is higher than 30% by weight, the aromatic amine antioxidant agents tend to make the rubber resins stained.

Aromatic amine-based antioxidant agents used in present invention include liquid and solid ones. Preferably, the liquid aromatic amine-based antioxidant agent is one or more selected from group "A-L" consisted of N,N'-di-sec-butyl-1,4-phenylenediamine and N-phenylbenzenamine reaction products with 2,4,4-trimethylpentene and 2,4,4-trimethylpentene. And preferably the solid aromatic amine-based antioxidant agent is one or more selected from group "A-S" consisted of poly(1,2-dihydro-2,2,4-trimethyl-quinoline), bis(4-octylphenyl)amine, 4,4'-bis(α,α-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, N,N'-bis(methylphenyl)-1,4-benzenediamine.

Hindered phenol-based antioxidant agents are often used in raw rubber resins since it has no staining problem and its antioxidant property is acceptable although not as strong as aromatic amine-based antioxidant agents.

Hindered phenol-based antioxidant agents used in present invention include liquid and solid ones. Preferably, the liquid hindered phenol-based antioxidant agent is one or more selected from group "B-L" consisted of poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester. And preferably the solid hindered phenol-based antioxidant agent is one or more selected from group "B—S" consisted of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl)propionate), triethylene glycol-bis[3-(3-tert-butyl-5-methyl-4-hydrophenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thiodiethylene bis[3-(3,5-di-tert-butyl-4-hydroxyphenyl) propionate].

As an optional component in present invention, phosphite-based antioxidant agent is often used together with hindered phenol-based antioxidant agents as auxiliary antioxidant. When phosphite-based antioxidant agents exist, better antioxidant properties are brought than hindered phenol-based antioxidant agents appear alone.

When exists, the phosphite-based antioxidant agent used in present invention include liquid and solid ones. Preferably, the liquid phosphite-based antioxidant agent is one or more selected from group "C-L" consisted of diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, triphenyl phosphite, triisodecyl phosphite, tris(2-ethylhexyl)phosphite, tetraphenyltetra(tridecyl)pentaerythritol tetraphosphite, 1,1,3-tris(2-methyl-4-di-tridecylphosphite-5-tert-butylphenyl)butane, 4,4'-butylidene bis(3-methyl-6-tert-butyl-di-tridecyl phosphite), 2,2'-ethylidene bis(4,6-di-tert-butyl-phenol)fluorophosphite, 4,4'-isopropylidene-diphenyl alkyl ($C_{12}$ to $C_{15}$) phosphites, bis(nonylphenyl)pentaerythritol diphosphite, hydrogenated bisphenol A-pentaerythritol phosphite polymers, tetra-C12-15-alkyl(propane-2,2-diylbis(4,1-phenylene))bis(phosphite), 2-entylhexyldiphenyl phosphite, tris(nonyl-phenyl)phosphite, tris((mono and di)-nonylphenyl)phosphite. And preferably, the solid phosphite-based antioxidant agent is one or more selected from group "C—S" consisted of tri-(2,4-di-tert-butylphenyl)phosphite, tetraphenyl dipropylene glycol diphosphite, distearylpentaerythritoldiphosphite, 3,9-bis(octadecyloxy)-2,4,8,10-tetraoxa-3,9-diphosphaspiro[5.5]undecane.

Preferably, the antioxidant composition of present invention is prepared according to the process comprising steps of i) dissolving component a), b) and c) into d); ii) diluting liquid antioxidant composition by solvent for solution polymerization of raw rubbers; iii) adding diluted liquid antioxidant composition into raw rubbers synthesized via solution polymerization.

The antioxidant composition according to present invention is applicable for all types of rubber resins synthesized via solution polymerization including ionic and radical polymerization, for example, polybutadiene, polyisoprene, polybutene, poly(styrene-co-butadiene).

The antioxidant composition according to present invention is also applicable for raw rubber resins synthesized via bulk polymerization such as butadiene rubber and isoprene rubber. When the invented antioxidant composition is used for rubber resins synthesized via bulk polymerization, 0.2 part of the antioxidant composition is added into 100 part of rubber resins synthesized via bulk polymerization.

With adding emulsifier agents, the antioxidant composition of present invention is also applicable for rubber resins synthesized via emulsion polymerization including ionic and radical polymerization such as polychloroprene and copolymer of ethylene and propylene. The applicable emulsifier agents include nonionic, cationic, anionic and zwitterionic types. Preferably, the nonionic emulsifier is one or more selected from sorbitan tribleate, polyoxyethylene sorbitol hexastearate, propylene glycol fatty acid ester, glycerol monostearate, sorbitan monooleate, sorbitan monopalmitate, volvoxvlropylene mannitoldioleate, olyoxypropylene stearate, tetraethylene glycol monolaurate, polyoxyethylene monooleate, polyoxyethylene monolaurate, polyoxyethylene sorbitan, polyoxyethylene monostearate. Preferably, the cationic emulsifier is N-cetyl N-ethyl morpholinium ethosulfate. Preferably, the anionic emulsifier is sodium or potassium aliphatate, sodium or potassium alkyl benzene sulfonate, sodium abietate, oteic acid, sodium dodecyl benzene sulfonate, triethanolamine oleate, potassium oleate, sodium oleate, sodium lauryl sulfate, sodium lauryl sulfate. Preferably, the zwitterionic emulsifier is one or more selected from lauraminopropionic acid, amphiprotic surfactant BS-12, caprylyl sulfobetaine.

When the invented antioxidant composition is used for rubber resins synthesized via emulsion polymerization, 0.2 part of the invented antioxidant composition and 0.002 to 0.02 part emulsifier are added into 0.1 to 0.4 part of water, and the obtained emulsion is added into 100 part of rubber resins synthesized via emulsion polymerization.

Kinematic Viscosity test is carried out on the prepared antioxidant composition at 0° C., 10° C. and 25° C. respectively.

Kinematic Viscosity is tested based on ISO3219 that is obtained from dynamic viscosity divided by density.

The results of Kinematic Viscosity test show that the antioxidant composition of present invention has a freezing point lower than 0° C. under 101.325 KPa. Therefore, the antioxidant composition has no problem in fluidity under most operating conditions.

The weight ratio of antioxidant composition in dry raw rubbers is from 0.1% to 2% based on the total weight of raw rubbers. The antioxidant composition keeps taking effect during and after removing the solvent of solution polymerization of rubber resins and other common steps in raw rubbers production such as rolling.

Yellowing index test and Mooney Viscosity test are carried out on raw rubber samples containing antioxidant composition since the two parameters are most significant for raw rubber products.

Yellowing index is a color rating parameter measured via reflectivity of samples under red, green and blue lights having white board of magnesium oxide under a standard Carbon light as a reference. And the test standard of Yellowing index is ASTM E313-1996.

A raw rubber product comprising the antioxidant composition of present invention has yellowing index less than 20 according to ASTM E313-1996. If yellowing index of the rubber is higher than 20, the color properties of rubber products will be highly affected.

Mooney viscosity is a measurement of the viscosity using the Mooney Shearing Disk Viscometer. And the test standard of Mooney viscosity is ISO 289-1:1994.

The Mooney Viscosity of the raw rubber product comprising the antioxidant composition of present invention has a change less than 10% during storage period. If the change of Mooney Viscosity is higher than 10%, the processing properties of the raw rubber products will be deteriorating.

Technical Effect

During the "drying" process of rubber resins synthesized via solution polymerization, hot water or steam is used to remove solvent used for solution polymerization of rubber resins. Most of the antioxidant agents stay in the solvent but do not move to water, which avoids the loss of antioxidant agents and maintains the efficiency of anti-oxidant. Simultaneously, the obtained raw rubbers are not stained.

The antioxidant composition of present invention has a freezing point lower than 0° C. under 101.325 KPa, which enables a wide temperature range for applying the antioxidant composition since the antioxidant composition has no liquidity problem in cold weather or environment.

Moreover, the antioxidant composition of present invention is applicable in various rubber resins synthesized via solution polymerization including cationic polymerization, anionic polymerization and free radical polymerization.

Additionally, when the solvent of present invention is selected from linear or branched saturated acid having $C_8$ to $C_{18}$ or linear or branched saturated alcohol having $C_8$ to $C_{18}$, it brings a further advantage, that is, acid or alcohol solvents react with metal cations of Li, Ni, Co etc. in rubber resins introduced by initiator or catalyst. These metal cations are able to react with antioxidant agents and therefore decrease effective antioxidant agents.

Embodiment

The 1$^{st}$ embodiment is a liquid antioxidant composition comprising 10% to 20% by weight of component a) that is one or more liquid aromatic amine-based antioxidant agent selected from group "A-L"; 55% to 65% by weight of component b) that is one or more liquid hindered phenol-based antioxidant agent selected from group "B-L"; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 2$^{nd}$ embodiment is a liquid antioxidant composition comprising 10% to 20% by weight of component a) that is one or more liquid aromatic amine-based antioxidant agent selected from group "A-L"; 55% to 65% by weight of component b) that is one or more solid hindered phenol-based antioxidant agent selected from group "B—S"; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 3$^{rd}$ embodiment is a liquid antioxidant composition comprising 10% to 20% by weight of component a) that is one or more solid aromatic amine-based antioxidant agent selected from group "A-S"; 55% to 65% by weight of component b) that is one or more liquid hindered phenol-based antioxidant agent selected from group "B-L"; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 4$^{th}$ embodiment is a liquid antioxidant composition comprising 5% to 20% by weight of component a) that is one or more solid aromatic amine-based antioxidant agent selected from group "A-S"; 50% to 65% by weight of component b) that is one or more solid hindered phenol-based antioxidant agent selected from group "B—S"; 30% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 5$^{th}$ embodiment is a liquid antioxidant composition comprising 5% to 20% by weight of component a) that is one or more liquid aromatic amine-based antioxidant agent selected from group "A-L"; 30% to 50% by weight of component b) that is one or more liquid hindered phenol-based antioxidant agent selected from group "B-L"; 5% to 30% by weight of component c) that is one or more liquid phosphite-based antioxidant agent selected from group "C-L"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 6$^{th}$ embodiment is a liquid antioxidant composition comprising 5% to 20% by weight of component a) that is one or more solid aromatic amine-based antioxidant agent selected from group "A-S"; 30% to 50% by weight of component b) that is one or more liquid hindered phenol-based antioxidant agent selected from group "B-L"; 5% to 30% by weight of component c) that is one or more liquid phosphite-based antioxidant agent selected from group "C-L"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 7$^{th}$ embodiment is a liquid antioxidant composition comprising 5% to 20% by weight of component a) that is one or more liquid aromatic amine-based antioxidant agent selected from group "A-L"; 30% to 50% by weight of component b) that is one or more solid hindered phenol-based antioxidant agent selected from group "B—S"; 5% to 30% by weight of component c) that is one or more liquid phosphite-based antioxidant agent selected from group "C-L"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 8$^{th}$ embodiment is a liquid antioxidant composition comprising 5% to 20% by weight of component a) that is one or more liquid aromatic amine-based antioxidant agent selected from group "A-L"; 30% to 50% by weight of component b) that is one or more liquid hindered phenol-based antioxidant agent selected from group "B-L"; 5% to 30% by weight of component c) that is one or more solid phosphite-based antioxidant agent selected from group "C—S"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 9$^{th}$ embodiment is a liquid antioxidant composition comprising 5% to 20% by weight of component a) that is one or more liquid aromatic amine-based antioxidant agent selected from group "A-L"; 30% to 50% by weight of component b) that is one or more solid hindered phenol-based antioxidant agent selected from group "B—S"; 5% to 30% by weight of component c) that is one or more solid phosphite-based antioxidant agent selected from group "C—S"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 10$^{th}$ embodiment is a liquid antioxidant composition comprising 5% to 20% by weight of component a) that is one or more solid aromatic amine-based antioxidant agent selected from group "A-S"; 30% to 50% by weight of component b) that is one or more liquid hindered phenol-based antioxidant agent selected from group "B-L"; 5% to 30% by weight of component c) that is one or more solid phosphite-based antioxidant agent selected from group "C—S"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 11$^{th}$ embodiment is a liquid antioxidant composition comprising 5% to 20% by weight of component a) that is one or more solid aromatic amine-based antioxidant agent selected from group "A-S"; 30% to 50% by weight of component b) that is one or more solid hindered phenol-based antioxidant agent selected from group "B—S"; 5% to 30% by weight of component c) that is one or more liquid phosphite-based antioxidant agent selected from group "C-L"; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 12$^{th}$ embodiment is a liquid antioxidant composition comprising 5% to 20% by weight of component a) that is one or more solid aromatic amine-based antioxidant agent selected from group "A-S"; 30% to 50% by weight of component b) that is one or more solid hindered phenol-based antioxidant agent selected from group “B—S”; 5% to 30% by weight of component c) that is one or more solid phosphite-based antioxidant agent selected from group “C—S”; 30% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 13$^{th}$ embodiment is a liquid antioxidant composition comprising 5% to 20% by weight of component a) that is a mixture of liquid aromatic amine-based antioxidant agent selected from group “A-L” and solid aromatic amine-based antioxidant agent selected from group “A-S”; 30% to 50% by weight of component b) that is either liquid hindered phenol-based antioxidant agent selected from group “B-L” or solid hindered phenol-based antioxidant agent selected from group “B—S”; 5% to 30% by weight of component c) that is either liquid phosphite-based antioxidant agent selected from group “C-L” or solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 14$^{th}$ embodiment is a liquid antioxidant composition comprising 5% to 20% by weight of component a) that is either liquid aromatic amine-based antioxidant agent selected from group “A-L” or solid aromatic amine-based antioxidant agent from group “A-S”; 30% to 50% by weight of component b) that is a mixture of liquid hindered phenol-based antioxidant agent selected from group “B-L” and solid hindered phenol-based antioxidant agent selected from group “B—S”; 5% to 30% by weight of component c) that is either liquid phosphite-based antioxidant agent selected from group “C-L” or solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 15$^{th}$ embodiment is a liquid antioxidant composition comprising 5% to 20% by weight of component a) that is either liquid aromatic amine-based antioxidant agent selected from group “A-L” or solid aromatic amine-based antioxidant agent selected from group “A-S”; 30% to 50% by weight of component b) that is either liquid hindered phenol-based antioxidant agent selected from group “B-L” or solid hindered phenol-based antioxidant agent selected from group “B—S”; 5% to 30% by weight of component c) that is a mixture of liquid phosphite-based antioxidant agent selected from group “C-L” and solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 16$^{th}$ embodiment is a liquid antioxidant composition comprising 5% to 20% by weight of component a) that is a mixture of liquid aromatic amine-based antioxidant agent selected from group “A-L” and solid aromatic amine-based antioxidant agent selected from group “A-S”; 30% to 50% by weight of component b) that is a mixture of liquid hindered phenol-based antioxidant agent selected from group “B-L” and solid hindered phenol-based antioxidant agent selected from group “B—S”; 5% to 30% by weight of component c) that is either liquid phosphite-based antioxidant agent selected from group “C-L” or solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 17$^{th}$ embodiment is a liquid antioxidant composition comprising 5% to 20% by weight of component a) that is a mixture of liquid aromatic amine-based antioxidant agent selected from group “A-L” and solid aromatic amine-based antioxidant agent selected from group “A-S”; 30% to 50% by weight of component b) that is either liquid hindered phenol-based antioxidant agent selected from group “B-L” or solid hindered phenol-based antioxidant agent selected from group “B—S”; 5% to 30% by weight of component c) that is a mixture of liquid phosphite-based antioxidant agent selected from group “C-L” and solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 18$^{th}$ embodiment is a liquid antioxidant composition comprising 5% to 20% by weight of component a) that is either liquid aromatic amine-based antioxidant agent selected from group “A-L” or solid aromatic amine-based antioxidant agent selected from group “A-S”; 30% to 50% by weight of component b) that is a mixture of liquid hindered phenol-based antioxidant agent selected from group “B-L” and solid hindered phenol-based antioxidant agent selected from group “B—S”; 5% to 30% by weight of component c) that is a mixture of liquid phosphite-based antioxidant agent selected from group “C-L” and solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 19$^{th}$ embodiment is a liquid antioxidant composition comprising 5% to 20% by weight of component a) that is a mixture of liquid aromatic amine-based antioxidant agent selected from group “A-L” and solid aromatic amine-based antioxidant agent selected from group “A-S”; 30% to 50% by weight of component b) that is a mixture of liquid hindered phenol-based antioxidant agent selected from group “B-L” and solid hindered phenol-based antioxidant agent selected from group “B—S”; 5% to 30% by weight of component c) that is a mixture of liquid phosphite-based antioxidant agent selected from group “C-L” and solid phosphite-based antioxidant agent selected from group “C—S” and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 20$^{th}$ embodiment is a liquid antioxidant composition comprising 10% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 55% to 65% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis [octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 21$^{st}$ embodiment is a liquid antioxidant composition comprising 10% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 55% to 65% by weight of component b) that is one or more solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 22$^{nd}$ embodiment is a liquid antioxidant composition comprising 10% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 55% to 65% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 25% to 30% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 23$^{th}$ embodiment is a liquid antioxidant composition comprising 5% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, Poly(1,2-dihydro-2,2,4-trimethyl-quinoline), N-phenyl-N'-(1,3-dimethylbutyl)-p-phenylenediamine; 50% to 65% by weight of component b) that is one or more solid hindered phenol-based antioxidant agent selected from 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl) propionate]; 30% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 24$^{th}$ embodiment is a liquid antioxidant composition comprising 5% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis [(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 5% to 30% by weight of component c) that is one or more liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, tetra-C12-15-alkyl (propane-2,2-diylbis(4,1-phenylene))bis(phosphite); 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 25$^{th}$ embodiment is a liquid antioxidant composition comprising 5% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, Poly(1,2-dihydro-2,2,4-trimethyl-quinoline), N-phenyl-N'-(1,3-dimethylbutyl)-p-phenylenediamine; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 5% to 30% by weight of component c) that is one or more liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, Tetra-C12-15-alkyl (propane-2,2-diylbis(4,1-phenylene))bis(phosphite); 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 26$^{th}$ embodiment is a liquid antioxidant composition comprising 5% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 30% to 50% by weight of component b) that is one or more solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is one or more liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, Tetra-C12-15-alkyl (propane-2,2-diylbis(4,1-phenylene))bis(phosphite); 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 27$^{th}$ embodiment is a liquid antioxidant composition comprising 5% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[) methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 5% to 30% by weight of component c) that is one or more solid phosphite-based antioxidant agent selected from tris (2,4-di-tert-butylphenyl)phosphite, tetraphenyl dipropylene glycol diphosphite, distearylpentaerythritoldiphosphite; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 28$^{th}$ embodiment is a liquid antioxidant composition comprising 5% to 20% by weight of component a) that is one or more liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene; 30% to 50% by weight of component b) that is one or more solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is one or more solid phosphite-based antioxidant agent selected from tris(2,4-di-tert-butylphenyl)phosphite, tetraphenyl dipropylene glycol diphosphite, distearylpentaerythritoldiphosphite; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 29$^{th}$ embodiment is a liquid antioxidant composition comprising 5% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N-(1,3-dimethylbutyl)-p-phenylenediamine; 30% to 50% by weight of component b) that is one or more liquid hindered phenol-based antioxidant agent selected from poly (oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis [(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester; 5% to 30% by weight of component c) that is one or more solid phosphite-based antioxidant agent selected from tris (2,4-di-tert-butylphenyl)phosphite, tetraphenyl dipropylene glycol diphosphite, distearylpentaerythritoldiphosphite; 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 30$^{th}$ embodiment is a liquid antioxidant composition comprising 5% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is one or more solid hindered phenol-based antioxidant agent selected from 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl) propionate]; 5% to 30% by weight of component c) that is one or more liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl)butane, tris(nonyl-phenyl)phosphite, Tetra-C12-15-alkyl(propane-2,2-diylbis(4,1-phenylene))bis (phosphite); 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 31$^{th}$ embodiment is a liquid antioxidant composition comprising 5% to 20% by weight of component a) that is one or more solid aromatic amine-based antioxidant agent selected from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is one or more solid hindered phenol-based antioxidant agent selected from 2,4-bis[(dodecylthio)methyl]-o-cresol, 4,4'-butylidene bis- (3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl) propionate]; 5% to 30% by weight of component c) that is one or more solid phosphite-based antioxidant agent selected from 3,9-bis(octadecyloxy)-2,4,8,10-tetraoxa-3,9-diphosphaspiro[5.5]-undecane, tris(2,4-di-tert-butylphenyl) phosphite, tetraphenyl dipropylene glycol diphosphite, distearylpentaerythritoldiphosphite; 30% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 32$^{th}$ embodiment is a liquid antioxidant composition comprising 5% to 20% by weight of component a) that is a mixture of liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene and solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester or solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is either liquid phosphite-based antioxidant agent selected from diphenyl-mono (2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl) pentaerythritol tetraphosphite, 1,1,3-tris(2-methyl-4-di-tridecylphosphite-5-tert-butylphenyl)butane, tris(nonyl-phenyl)phosphite, Tetra-C12-15-alkyl(propane-2,2-diylbis(4,1-phenylene))bis(phosphite) or solid phosphite-based antioxidant agent selected from tris(2,4-di-tert-butylphenyl) phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 33$^{th}$ embodiment is a liquid antioxidant composition comprising 5% to 20% by weight of component a) that is either liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene or solid aromatic amine-based antioxidant agent from bis(4-octylphenyl)amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester and solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is either liquid phosphite-based antioxidant agent selected from diphenyl-mono (2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl) pentaerythritol tetraphosphite, 1,1,3-tris(2-methyl-4-di-tridecylphosphite-5-tert-butylphenyl)butane, tris(nonyl-phenyl)phosphite, Tetra-C12-15-alkyl(propane-2,2-diylbis(4,1-phenylene))bis(phosphite) or solid phosphite-based antioxidant agent selected from tris(2,4-di-tert-butylphenyl) phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 34$^{th}$ embodiment is a liquid antioxidant composition comprising 5% to 20% by weight of component a) that is either liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene or solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methyl-phenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester or solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is a mixture of liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, tetra-C12-15-alkyl (propane-2,2-diylbis(4,1-phenylene))bis(phosphite) and solid phosphite-based antioxidant agent selected from tris (2,4-di-tert-butylphenyl)phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 35th embodiment is a liquid antioxidant composition comprising 5% to 20% by weight of component a) that is a mixture of liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene and solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methylphenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester and solid hindered phenol-based antioxidant agent selected from 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is either liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl) pentaerythritol tetraphosphite, 1,1,3-tris(2-methyl-4-di-tridecylphosphite-5-tert-butylphenyl)butane, tris(nonyl-phenyl)phosphite, Tetra-C12-15-alkyl(propane-2,2-diylbis(4,1-phenylene))bis(phosphite) or solid phosphite-based antioxidant agent selected from tris(2,4-di-tert-butylphenyl) phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 36th embodiment is a liquid antioxidant composition comprising 5% to 20% by weight of component a) that is a mixture of liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene and solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methylphenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester or solid hindered phenol-based antioxidant agent selected from 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is a mixture of liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, tetra-C12-15-alkyl (propane-2,2-diylbis(4,1-phenylene))bis(phosphite) and solid phosphite-based antioxidant agent selected from tris (2,4-di-tert-butylphenyl)phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 37th embodiment is a liquid antioxidant composition comprising 5% to 20% by weight of component a) that is either liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene or solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methylphenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester and solid hindered phenol-based antioxidant agent selected from 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is a mixture of liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, Tetra-C12-15-alkyl (propane-2,2-diylbis(4,1-phenylene))bis(phosphite) and solid phosphite-based antioxidant agent selected from tris (2,4-di-tert-butylphenyl)phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 38th embodiment is a liquid antioxidant composition comprising 5% to 20% by weight of component a) that is a mixture of liquid aromatic amine-based antioxidant agent selected from N,N'-di-sec-butyl-1,4-phenylenediamine, N-phenylbenzenamine reaction products with 2,4,4-trimethylpentene, 2,4,4-trimethylpentene and solid aromatic amine-based antioxidant agent selected from bis(4-octylphenyl) amine, 4,4'-bis(α,α-dimethylbenzyl)diphenylamine, N,N'-di-2-naphthyl-p-phenylenediamine, N,N'-bis(methylphenyl)-1,4-benzendiamine, poly(1,2-dihydro-2,2,4-trimethyl-quinoline), N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester and solid hindered phenol-based antioxidant agent selected from 2,4-bis[(dodecylthio) methyl]-o-cresol, 4,4'-butylidene bis-(3-methyl-6-tert-butylphenol), 3,5-bis(1,1-dimethylethyl)-4-hydroxybenzenepropanoic acid octadecyl ester, triethylene glycol-bis[3-(3-tert-butyl-5-methyl-4-hydrophenyl)propionate]; 5% to 30% by weight of component c) that is a mixture of liquid phosphite-based antioxidant agent selected from diphenyl-mono(2-ethylhexyl)phosphite, diphenyl-monotridecyl-phosphite, diphenyl-isodecylphosphite, diphenyl-isooctyl-phosphite, diphenyl-nonylphenyl-phosphite, tetraphenyltetra(tridecyl)pentaerythritol tetraphosphite, 1,1,3-tris(2-methyl-4-di-tridecylphosphite-5-tert-butylphenyl) butane, tris(nonyl-phenyl)phosphite, tetra-C12-15-alkyl (propane-2,2-diylbis(4,1-phenylene))bis(phosphite) and solid phosphite-based antioxidant agent selected from tris (2,4-di-tert-butylphenyl)phosphite, tetraphenyl dipropylene glycol diphosphite, distearylpentaerythritoldiphosphite and 20% to 40% by weight of component d) that is one or more solvent selected from n-dodecane, paraffin oil, naphthenic oil, arene oil, hexanoic acid, heptanoic acid, 2-ethylhexanoic acid, isononanoic acid, neodecanoic acid, n-nonanol, isodecyl alcohol, isooctyl alcohol, ethyl oleate, butyl oleate.

The 39$^{th}$ embodiment is a liquid antioxidant composition comprising 10% to 20% by weight of component a) that is N-phenylbenzenamine reaction products with 2,4,4-trimethylpentene; 55% to 65% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters; 25% to 30% by weight of component d) that is one or more solvent selected from naphthenic oil, isooctyl alcohol, 2-ethylhexanoic acid, butyl oleate, paraffin oil.

The 40$^{th}$ embodiment is a liquid antioxidant composition comprising 10% to 20% by weight of component a) that is N-phenylbenzenamine reaction products with 2,4,4-trimethylpentene; 55% to 65% by weight of component b) that is one or more solid hindered phenol-based antioxidant agent selected from 2,4-bis[(dodecylthio)methyl]-o-cresol, 3,5-bis (1,1-dimethylethyl)-4-hydroxybenzenepropanoic acid octadecyl esters; 25% to 30% by weight of component d) that is one or more solvent selected from naphthenic oil, isooctyl alcohol, 2-ethylhexanoic acid, butyl oleate, paraffin oil.

The 41$^{st}$ embodiment is a liquid antioxidant composition comprising 10% to 20% by weight of component a) that is one or more solid aromatic amine-based antioxidant agent selected from bis(4-octylphenyl)amine, N-phenyl-N'-(1,3-dimethylbutyl)-p-phenylenediamine; 55% to 65% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis [(octylthio)methyl]-o-cresol, 3,5-bis(1,1-dimethylethyl)-4-hydroxybenzenepropanoic acid C7-C9-branched alkyl esters; 25% to 30% by weight of component d) that is one or more solvent selected from naphthenic oil, isooctyl alcohol, 2-ethylhexanoic acid, butyl oleate, paraffin oil.

The 42$^{th}$ embodiment is a liquid antioxidant composition comprising 5% to 20% by weight of component a) that is one or more solid aromatic amine-based antioxidant agent selected from bis(4-octylphenyl)amine, N-phenyl-N'-(1,3-dimethylbutyl)-p-phenylenediamine; 50% to 65% by weight of component b) that is one or more solid hindered phenol-based antioxidant agent selected from 2,4-bis[(dodecylthio) methyl]-o-cresol, 3,5-bis(1,1-dimethylethyl)-4-hydroxybenzenepropanoic acid octadecyl esters; 30% to 40% by weight of component d) that is one or more solvent selected from naphthenic oil, isooctyl alcohol, 2-ethylhexanoic acid, butyl oleate, paraffin oil.

The 43$^{th}$ embodiment is a liquid antioxidant composition comprising 5% to 20% by weight of component a) that is N-phenylbenzenamine reaction products with 2,4,4-trimethylpentene; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters; 5% to 30% by weight of component c) that is tetra-$C_{12-15}$-alkyl(propane-2,2-diylbis(4,1-phenylene))bis(phosphite); 20% to 40% by weight of component d) that is one or more solvent selected from naphthenic oil, isooctyl alcohol, 2-ethylhexanoic acid, butyl oleate, paraffin oil.

The 44$^{th}$ embodiment is a liquid antioxidant composition comprising 5% to 20% by weight of component a) that is one or more solid aromatic amine-based antioxidant agent selected from bis(4-octylphenyl)amine, N-phenyl-N'-(1,3-dimethylbutyl)-p-phenylenediamine; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis [(octylthio)methyl]-o-cresol, 3,5-bis(1,1-dimethylethyl)-4-hydroxybenzenepropanoic acid C7-C9-branched alkyl esters; 5% to 30% by weight of component c) that is tetra-$C_{12-15}$-alkyl(propane-2,2-diylbis(4,1-phenylene))bis (phosphite); 20% to 40% by weight of component d) that is one or more solvent selected from naphthenic oil, isooctyl alcohol, 2-ethylhexanoic acid, butyl oleate, paraffin oil.

The 45$^{th}$ embodiment is a liquid antioxidant composition comprising 5% to 20% by weight of component a) that is N-phenylbenzenamine reaction products with 2,4,4-trimethylpentene; 30% to 50% by weight of component b) that is one or more solid hindered phenol-based antioxidant agent selected from 2,4-bis[(dodecylthio)methyl]-o-cresol, 3,5-bis (1,1-dimethylethyl)-4-hydroxybenzenepropanoic acid octadecyl esters; 5% to 30% by weight of component c) that is tetra-$C_{12-15}$-alkyl(propane-2,2-diylbis(4,1-phenylene))bis (phosphite); 20% to 40% by weight of component d) that is one or more solvent selected from naphthenic oil, isooctyl alcohol, 2-ethylhexanoic acid, butyl oleate, paraffin oil.

The 46$^{th}$ embodiment is a liquid antioxidant composition comprising 5% to 20% by weight of component a) that is N-phenylbenzenamine reaction products with 2,4,4-trimethylpentene; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters; 5% to 30% by weight of component c) that is 3,9-bis(octadecyloxy)-2,4,8,10-tetraoxa-3,9-diphosphaspiro[5.5]undecane; 20% to 40% by weight of component d) that is one or more solvent selected from naphthenic oil, isooctyl alcohol, 2-ethylhexanoic acid, butyl oleate, paraffin oil.

The 47$^{th}$ embodiment is a liquid antioxidant composition comprising 5% to 20% by weight of component a) that is N-phenylbenzenamine reaction products with 2,4,4-trimethylpentene; 30% to 50% by weight of component b) that is one or more solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is 3,9-bis(octadecyloxy)-2,4,8,10-tetraoxa-3,9-diphosphaspiro[5.5]undecane; 20% to 40% by weight of component d) that is one or more solvent selected from naphthenic oil, isooctyl alcohol, 2-ethylhexanoic acid, butyl oleate, paraffin oil.

The 48$^{th}$ embodiment is a liquid antioxidant composition comprising 5% to 20% by weight of component a) that is one or more solid aromatic amine-based antioxidant agent selected from bis(4-octylphenyl)amine, N-phenyl-N'-(1,3-dimethylbutyl)-p-phenylenediamine; 30% to 50% by weight of component b) that is one or more liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters; 5% to 30% by weight of component c) that is 3,9-bis(octadecyloxy)-2,4,8,10-tetraoxa-3,9-diphosphaspiro[5.5]undecane; 20% to 40% by weight of component d) that is one or more solvent selected from naphthenic oil, isooctyl alcohol, 2-ethylhexanoic acid, butyl oleate, paraffin oil.

The 49$^{th}$ embodiment is a liquid antioxidant composition comprising 5% to 20% by weight of component a) that is bis(4-octylphenyl)amine, N-phenyl-N'-(1,3-dimethylbutyl)-p-phenylenediamine; 30% to 50% by weight of component b) that is one or more solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is tetra-$C_{12-15}$-alkyl(propane-2,2-diylbis(4,1-phenylene))bis(phosphite); 20% to 40% by weight of component d) that is one or more solvent selected from naphthenic oil, isooctyl alcohol, 2-ethylhexanoic acid, butyl oleate, paraffin oil.

The 50$^{th}$ embodiment is a liquid antioxidant composition comprising 5% to 20% by weight of component a) that is one or more solid aromatic amine-based antioxidant agent selected from bis(4-octylphenyl)amine, N-phenyl-N'-(1,3-dimethylbutyl)-p-phenylenediamine; 30% to 50% by weight of component b) that is one or more solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is 3,9-bis(octadecyloxy)-2,4,8,10-tetraoxa-3,9-diphosphaspiro[5.5]undecane; 30% to 40% by weight of component d) that is one or more solvent selected from naphthenic oil, isooctyl alcohol, 2-ethylhexanoic acid, butyl oleate, paraffin oil.

The 51$^{th}$ embodiment is a liquid antioxidant composition comprising 5% to 20% by weight of component a) that is a mixture of liquid aromatic amine-based antioxidant agent that is N-phenylbenzenamine reaction products with 2,4,4-trimethylpentene and solid aromatic amine-based antioxidant agent selected from bis(4-octylphenyl)amine, N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters or solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is either liquid phosphite-based antioxidant agent that is tetra-$C_{12-15}$-alkyl(propane-2,2-diylbis(4,1-phenylene))bis(phosphite) or solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

The 52$^{th}$ embodiment is a liquid antioxidant composition comprising 5% to 20% by weight of component a) that is either liquid aromatic amine-based antioxidant agent that is N-phenylbenzenamine reaction products with 2,4,4-trimethylpentene or solid aromatic amine-based antioxidant agent selected from bis(4-octylphenyl)amine, N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters and solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is either liquid phosphite-based antioxidant agent that is tetra-$C_{12-15}$-alkyl(propane-2,2-diylbis(4,1-phenylene))bis(phosphite) or solid phosphite-based antioxidant agent that is tetra-$C_{12-15}$-alkyl(propane-2,2-diylbis(4,1-phenylene))bis(phosphite) and 20% to 40% by weight of component d) that is one or more solvent selected from naphthenic oil, isooctyl alcohol, 2-ethylhexanoic acid, butyl oleate, paraffin oil.

The 53$^{th}$ embodiment is a liquid antioxidant composition comprising 5% to 20% by weight of component a) that is either liquid aromatic amine-based antioxidant agent that is N-phenylbenzenamine reaction products with 2,4,4-trimethylpent or solid aromatic amine-based antioxidant agent selected from bis(4-octylphenyl)amine, N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)- alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters or solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is a mixture of liquid phosphite-based antioxidant agent that is tetra-$C_{12-15}$-alkyl(propane-2,2-diylbis(4,1-phenylene))bis(phosphite) and solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

The 54$^{th}$ embodiment is a liquid antioxidant composition comprising 5% to 20% by weight of component a) that is a mixture of liquid aromatic amine-based antioxidant agent that is N-phenylbenzenamine reaction products with 2,4,4-trimethylpentene and solid aromatic amine-based antioxidant agent selected from bis(4-octylphenyl)amine, N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters and solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is either liquid phosphite-based antioxidant agent that is tetra-$C_{12-15}$-alkyl(propane-2,2-diylbis(4,1-phenylene))bis(phosphite) or solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

The 55$^{th}$ embodiment is a liquid antioxidant composition comprising 5% to 20% by weight of component a) that is a mixture of liquid aromatic amine-based antioxidant agent that is N-phenylbenzenamine reaction products with 2,4,4-trimethylpentene and solid aromatic amine-based antioxidant agent selected from bis(4-octylphenyl)amine, N-phenyl-N'-(1,3-dimethylbutyl)-p-phenylenediamine; 30% to 50% by weight of component b) that is either liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters or solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is a mixture of liquid phosphite-based antioxidant agent that is tetra-$C_{12-15}$-alkyl(propane-2,2-diylbis(4,1-phenylene))bis(phosphite) and solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

The 56$^{th}$ embodiment is a liquid antioxidant composition comprising 5% to 20% by weight of component a) that is either liquid aromatic amine-based antioxidant agent that is N-phenylbenzenamine reaction products with 2,4,4-trimethylpentene or solid aromatic amine-based antioxidant agent selected from bis(4-octylphenyl)amine, N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters and solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is a mixture of liquid phosphite-based antioxidant agent that is tetra-$C_{12-15}$-alkyl(propane-2,2-diylbis(4,1-phenylene))bis(phosphite) and solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

The 57$^{th}$ embodiment is a liquid antioxidant composition comprising 5% to 20% by weight of component a) that is a mixture of liquid aromatic amine-based antioxidant agent that is N-phenylbenzenamine reaction products with 2,4,4-trimethylpentene and solid aromatic amine-based antioxidant agent selected from bis(4-octylphenyl)amine, N-phenyl-N'-(1,3-dimethylbutyl)-p-phenylenediamine; 30% to 50% by weight of component b) that is a mixture of liquid hindered phenol-based antioxidant agent selected from poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 3,5-bis(1,1-dimethylethyl)-4-hydroxybenzenepropanoic acid C7-C9-branched alkyl esters and solid hindered phenol-based antioxidant agent selected from 2,4-bis[(dodecylthio)methyl]-o-cresol, 3,5-bis(1,1-dimethylethyl)-4-hydroxybenzenepropanoic acid octadecyl esters; 5% to 30% by weight of component c) that is a mixture of liquid phosphite-based antioxidant agent that is tetra-$C_{12-15}$-alkyl(propane-2,2-diylbis(4,1-phenylene))bis(phosphite) and solid phosphite-based antioxidant agent that is 3,9-bis(octadecyloxy)-2,4,8,10-tetraoxa-3,9-diphosphaspiro[5.5]undecane and 20% to 40% by weight of component d) that is one or more solvent selected from naphthenic oil, isooctyl alcohol, 2-ethylhexanoic acid, butyl oleate, paraffin oil.

EXAMPLE

Below examples show how to prepare the antioxidant composition of present invention and the Mooney Viscosity and Yellowing Index test results of raw rubbers with the antioxidant composition added. These examples are used to illustrate the embodiment of present invention without any limitation on the protection scope of Claims.

Example 1

The antioxidant composition is prepared by mixing below components:

| | | | |
|---|---|---|---|
| Component a) | N-phenylbenzenamine reaction products with 2,4,4-trimethylpentene melting point; <−100° C. at 101.325 KPa | Irganox 5057, BASF | 20% |
| Component b) | 2,4-bis[(octylthio)methyl]-o-cresol melting point: 14° C. at 101.325 KPa | Irganox 1520, BASF | 20% |
| | 3,5-bis(1,1-dimethylethyl)-4-hydroxybenzenepropanoic acid C7-C9-branched alkyl ester melting point: <−30° C. at 101.325 KPa | Irganox 1135, BASF | 35% |
| Component d) | naphthenic oil boiling point: 210° C. at 101.325 KPa and freezing point: −26° C. at 101.325 KPa | KN4006 Petrol China | 25% |

The mixture of Component a) and Component b) has a melting point less than 25° C. at 101.325 KPa.

Example 2

The antioxidant composition is prepared by mixing below components:

| | | | |
|---|---|---|---|
| Component a) | bis(4-octylphenyl)amine melting point: 80-90° C. at 101.325 KPa | Antioxidant OD, Nanjing xingfa | 10% |
| Component b) | 3,5-bis(1,1-dimethylethyl)-4-hydroxybenzenepropanoic acid C7-C9-branched alkyl ester melting point: <−30° C. at 101.325 KPa | Irganox 1135, BASF | 35% |
| | 2,4-bis[(octylthio)methyl]-o-cresol melting point: 14° C. at 101.325 KPa | Irganox 1520, BASF | 15% |
| | 2,4-bis[(dodecylthio)methyl]-o-cresol melting point: 28° C. at 101.325 KPa | Irganox 1726, BASF | 15% |
| Component d) | naphthenic oil boiling point: 210° C. at 101.325 KPa and freezing point: −26° C. at 101.325 KPa | KN4006 Petrol China | 25% |

The mixture of Component a) and Component b) has a melting point less than 25° C. at 101.325 KPa.

Example 3

The antioxidant composition is prepared by mixing below components:

| | | | |
|---|---|---|---|
| Component a) | N-phenylbenzenamine reaction products with 2,4,4-trimethylpentene melting point: <−100° C. at 101.325 KPa | Irganox 5057, BASF | 10% |
| Component b) | 3,5-bis(1,1-dimethylethyl)-4-hydroxybenzenepropanoic acid octadecyl ester melting point: 50-55° C. at 101.325 KPa | Irganox 1076, BASF | 20% |
| | 2,4-bis[(octylthio)methyl]-o-cresol melting point: 14° C. at 101.325 KPa | Irganox 1520, BASF | 45% |
| Component d) | isooctyl alcohol boiling point: 186° C. at 101.325 KPa and freezing point: −76° C. at 101.325 KPa | Sinopec | 15% |
| | 2-ethylhexanoic acid boiling point: 270° C. at 101.325 KPa and freezing point: −30° C. at 101.325 KPa | BASF | 10% |

The mixture of Component a) and Component b) has a melting point less than 25° C. at 101.325 KPa.

Example 4

The antioxidant composition is prepared by mixing below components:

| | | | |
|---|---|---|---|
| Component a) | N-phenylbenzenamine reaction products with 2,4,4-trimethylpentene melting point: <−100° C. at 101.325 KPa | Irganox 5057, BASF | 20% |
| Component b) | 2,4-bis[(octylthio)methyl]-o-cresol melting point: 14° C. at 101.325 KPa | Irganox 1520, BASF | 20% |
| | 3,5-bis(1,1-dimethylethyl)-4-hydroxybenzenepropanoic acid C7-C9-branched alkyl ester melting point: <−30° C. at 101.325 KPa | Irganox 1135, BASF | 40% |
| Component d) | naphthenic oil boiling point: 210° C. at 101.325 KPa and freezing point: −26.4° C. at 101.325 KPa | KN4006 Petrol China | 20% |
| | butyl oleate boiling point: 228° C. at 101.325 KPa and freezing point: −26.4° C. at 101.325 KPa | BASF | 10% |

The mixture of Component a) and Component b) has a melting point less than 25° C. at 101.325 KPa.

Example 5

The antioxidant composition is prepared by mixing below components:

| | | | |
|---|---|---|---|
| Component a) | N-phenylbenzenamine reaction products with 2,4,4-trimethylpentene melting point: <−100° C. at 101.325 KPa | Irganox 5057, BASF | 20% |

-continued

| | | | |
|---|---|---|---|
| Component b) | 2,4-bis[(octylthio)methyl]-o-cresol<br>melting point: 14° C. at 101.325 KPa | Irganox 1520, BASF | 15% |
| | 3,5-bis(1,1-dimethylethyl)-4-hydroxybenzenepropanoic acid C7-C9-branched alkyl ester<br>melting point: <−30° C. at 101.325 KPa | Irganox 1135, BASF | 35% |
| | poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy]<br>melting point: −5-0° C. at 101.325 KPa | synthesized according to Example 1a in WO2010/003813 | 5% |
| Component d) | naphthenic oil<br>boiling point: 210° C. at 101.325 KPa and freezing point: −26.4° C. at 101.325 KPa | KN4006 Petrol China | 20% |
| | butyl oleate<br>boiling point: 228° C. at 101.325 KPa and freezing point: −26.4° C. at 101.325 KPa | BASF | 5% |

The mixture of Component a) and Component b) has a melting point less than 25° C. at 101.325 KPa.

Example 6

The antioxidant composition is prepared by mixing below components:

| | | | |
|---|---|---|---|
| Component a) | N-phenylbenzenamine reaction products with 2,4,4-trimethylpentene<br>melting point: <−100° C. at 101.325 KPa | Irganox 5057, BASF | 20% |
| Component b) | 2,4-bis[(dodecylthio)methyl]-o-cresol<br>melting point: 28° C. at 101.325 KPa | Irganox 1726, BASF | 15% |
| | 3,5-bis(1,1-dimethylethyl)-4-hydroxybenzenepropanoic acid C7-C9-branched alkyl ester<br>melting point: <−30° C. at 101.325 KPa | Irganox 1135, BASF | 35% |
| | poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy]<br>melting point: −5-0° C. at 101.325 KPa | synthesized according to Example 1a in WO2010/003813 | 5% |
| Component d) | naphthenic oil<br>boiling point: 210° C. at 101.325 KPa and freezing point: −26.4° C. at 101.325 KPa | KN4006 Petrol China | 20% |
| | butyl oleate<br>boiling point: 228° C. at 101.325 KPa and freezing point: −26.4° C. at 101.325 KPa | BASF | 5% |

The mixture of Component a) and Component b) has a melting point less than 25° C. at 101.325 KPa.

Example 7

The antioxidant composition is prepared by mixing below components:

| | | | |
|---|---|---|---|
| Component a) | bis(4-octylphenyl)amine<br>melting point: 80-90° C. at 101.325 KPa | Antioxidant OD, Nanjing xingfa | 10% |
| Component b) | 2,4-bis[(octylthio)methyl]-o-cresol<br>melting point: 14° C. at 101.325 KPa | Irganox 1520, BASF | 40% |
| Component c) | tetra-C12-15-alkyl(propane-2,2-diylbis(4,1-phenylene))bis(phosphite)<br>melting point: <−20° C. at 101.325 KPa | Phosphite 1500 Hengpu Chemical | 30% |
| Component d) | paraffin oil<br>boiling point: 215° C. at 101.325 KPa and freezing point: −20° C. at 101.325 KPa | KP6030# Petrol China | 20% |

The mixture of Component a), Component b) and Component c) has a melting point less than 25° C. at 101.325 KPa.

Example 8

The antioxidant composition is prepared by mixing below components:

| | | | |
|---|---|---|---|
| Component a) | N-phenyl-N'-(1,3-dimethylbutyl)-p-phenylenediamine<br>melting point: 44-45.5° C. at 101.325 KPa | Antioxidant 6PPD, Nanjing xingfa | 5% |
| Component b) | 2,4-bis[(octylthio)methyl]-o-cresol<br>melting point: 14° C. at 101.325 KPa | Irganox 1520, BASF | 30% |
| | 3,5-bis(1,1-dimethylethyl)-4-hydroxybenzenepropanoic acid octadecyl ester<br>melting point: 50-55° C. at 101.325 KPa | Irganox 1076, BASF | 5% |
| Component c) | tetra-C12-15-alkyl(propane-2,2-diylbis(4,1-phenylene))bis(phosphite)<br>melting point: <−20° C. at 101.325 KPa | Phosphite 1500 Hengpu Chemical | 30% |
| Component d) | paraffin oil<br>boiling point: 215° C. at 101.325 KPa and freezing point: −20° C. at 101.325 KPa | KP6030# Petrol China | 30% |

The mixture of Component a), Component b) and Component c) has a melting point higher than 25° C. at 101.325 KPa.

Example 9

The antioxidant composition is prepared by mixing below components:

| | | | |
|---|---|---|---|
| Component a) | bis(4-octylphenyl)amine<br>melting point: 80-90° C. at 101.325 KPa | Antioxidant OD, Nanjing xingfa | 5% |
| Component b) | 2,4-bis[(dodecylthio)methyl]-o-cresol<br>melting point: 28° C. at 101.325 KPa | Irganox 1726, BASF | 50% |

-continued

| | | | |
|---|---|---|---|
| Component c) | 3,9-bis(octadecyloxy)-2,4,8,10-tetraoxa-3,9-diphosphaspiro[5.5]undecane melting point: 44-47° C. at 101.325 KPa | Phosphite 618, Hengpu Chem | 5% |
| Component d) | naphthenic oil boiling point: 210° C. at 101.325 KPa and freezing point: −26° C. at 101.325 KPa | KN4006 Petrol China | 6% |
| | 2-ethylhexanoic acid boiling point: 270° C. at 101.325 KPa and freezing point: −30° C. at 101.325 KPa | BASF | 6% |
| | paraffin oil boiling point: 215° C. at 101.325 KPa and freezing point: −20° C. at 101.325 KPa | KP6030# Petrol China | 22% |
| | isooctyl alcohol boiling point: 186° C. at 101.325 KPa and freezing point: −76° C. at 101.325 KPa | Sinopec | 6% |

The mixture of Component a), Component b) and Component c) has a melting point higher than 25° C. at 101.325 KPa.

Comparative Example 1

As a comparison, below antioxidant composition is prepared as follows:

| | | | |
|---|---|---|---|
| Component a) | N-phenylbenzenamine reaction products with 2,4,4-trimethylpentene melting point: <−100° C. at 101.325 KPa | Irganox 5057, BASF | 20% |
| Component b) | 3,5-bis(1,1-dimethylethyl)-4-hydroxybenzenepropanoic acid C7-C9-branched alkyl esters melting point: <−30° C. at 101.325 KPa | Irganox 1135, BASF | 60% |
| Component d) | hexane boiling point: 68° C. at 101.325 KPa and freezing point: 6.5° C. at 101.325 KPa | Kezheng Chemical | 20% |

Comparative Example 2

As a comparison, below antioxidant composition is prepared as follows:

| | | | |
|---|---|---|---|
| Component a) | N-phenylbenzenamine reaction products with 2,4,4-trimethylpentene melting point: <−100° C. at 101.325 KPa | Irganox 5057, BASF | 20% |
| Component b) | 3,5-bis(1,1-dimethylethyl)-4-hydroxybenzenepropanoic acid C7-C9-branched alkyl esters melting point: <−30° C. at 101.325 KPa | Irganox 1135, BASF | 60% |
| Component d) | aromatic oil boiling point: 270° C. at 101.325 KPa and freezing point: 12° C. at 101.325 KPa | QS-4, Qianshun chemical | 20% |

Comparative Example 3

As a comparison, below antioxidant composition is prepared as follows:

| | | | |
|---|---|---|---|
| Component a) | N-phenylbenzenamine reaction products with 2,4,4-trimethylpentene melting point: <−100° C. at 101.325 KPa | Irganox 5057, BASF | 20% |
| Component b) | 3,5-bis(1,1-dimethylethyl)-4-hydroxybenzenepropanoic acid C7-C9-branched alkyl esters melting point: <−30° C. at 101.325 KPa | Irganox 1135, BASF | 30% |
| Component c) | tetra-C12-15-alkyl(propane-2,2-diylbis(4,1-phenylene))bis(phosphite) melting point: <−20° C. at 101.325 KPa | Phosphite 1500 Hengpu Chemical | 30% |
| Component d) | hexane boiling point: 68° C. at 101.325 KPa and freezing point: 6.5° C. at 101.325 KPa | Kezheng Chemical | 20% |

Comparative Example 4

As a comparison, below antioxidant composition is prepared as follows:

| | | | |
|---|---|---|---|
| Component a) | N-Phenylbenzenamine reaction products with 2,4,4-trimethylpentene melting point: <−100° C. at 101.325 KPa | Irganox 5057, BASF | 20% |
| Component b) | 3,5-bis(1,1-dimethylethyl)-4-hydroxybenzenepropanoic acid C7-C9-branched alkyl ester melting point: <−30° C. at 101.325 KPa | Irganox 1135, BASF | 30% |
| Component c) | tetra-C12-15-alkyl(propane-2,2-diylbis(4,1-phenylene))bis(phosphite) melting point: <−20° C. at 101.325 KPa | Phosphite 1500 Hengpu Chemical | 30% |
| Component d) | aromatic oil boiling point: 270° C. at 101.325 KPa and freezing point: 12° C. at 101.325 KPa | QS-4, Qianshun chemical | 20% |

A Kinematic Viscosity test is carried out on antioxidant compositions obtained from Examples 1 to 9 as well as Comparative examples 1 to 4 at 0° C., 10° C. and 25° C. respectively. The test results of Kinematic Viscosity are summarized in Table 1.

0.2 part of the antioxidant compositions obtained from Example 1 to 6 and are added into 3.8 part of hexane respectively. After that, the solutions are added into 100 part of solution of butadiene rubber resin respectively. After blending, the raw rubber samples #1 to #6 are obtained.

0.2 part of the antioxidant compositions obtained from Example 7 to 9 are added into 3.8 part of hexane respectively. After that, the solutions are added into 100 part of solution of styrene-butadiene rubber resin respectively. After blending, the raw rubber samples #7, #8 and #9 are obtained.

0.2 part of the antioxidant composition obtained from Comparative Example 1 and 3 is added into 3.8 part of hexane respectively. After that, the solutions re added into 100 part of solution of butyl rubber resin respectively. After blending, the raw rubber sample #C1 and #C3 are obtained.

0.2 part of the antioxidant composition obtained from Comparative Example 2 and 4 is added into 4 part of hexane respectively. After that, the solutions are added into 100 part of solution of styrene-butadiene rubber resin respectively. After blending, the raw rubber sample #C2 and #C4 obtained.

Mooney viscosity test and Yellowing index test are carried out on raw rubber samples #1 to #9 as well as samples #C1 to #C4.

The test results are summarized in Table 2.

TABLE 1

| | Example | | | | | | | | | | | | |
|---|---|---|---|---|---|---|---|---|---|---|---|---|---|
| | 1 | 2 | 3 | 4 | 5 | 6 | C. E. 1 | C. E. 2 | 7 | 8 | 9 | C. E. 3 | C. E. 4 |
| Kinematic Viscosity at 0° C. (mPa · s) | 3189 | 3152 | 3226 | 3240 | 3100 | 3180 | N/A* | N/A* | 2978 | 2846 | 3258 | 3293 | N/A* |
| Kinematic Viscosity at 10° C. (mPa · s) | 1397 | 1377 | 1385 | 1367 | 1200 | 1302 | 1430 | N/A* | 1214 | 1097 | 1322 | 1385 | N/A* |
| Kinematic Viscosity at 25° C. (mPa · s) | 346 | 322 | 365 | 355 | 285 | 311 | 487 | 926 | 298 | 259 | 451 | 448 | 821 |

N/A* means the sample turns to solid state.

TABLE 2

| | Sample | | | | | | | | | | | | |
|---|---|---|---|---|---|---|---|---|---|---|---|---|---|
| | #1 | #2 | #3 | #4 | #5 | #6 | #C1 | #C2 | #7 | #8 | #9 | #C3 | #C4 |
| 0 day Mooney viscosity (Mooney Unit) | 42 | 42 | 42 | 42 | 42 | 42 | 43 | 78 | 75 | 74 | 75 | 43 | 78 |
| 2 day Mooney viscosity (Mooney Unit) | 43 | 40 | 40 | 41 | 41 | 41 | 57 | 60 | 68 | 69 | 69 | 51 | 65 |
| Change of Mooney viscosity (%) | 2.4% | −4.7% | −4.7% | −2.4% | −2.4% | −2.4% | 32.5% | −23.1% | −9.3% | −6.7% | −8% | 18.6% | −16.6% |
| 0 day Yellowing Index | 7 | 7 | 7 | 9 | 10 | 10 | 10 | 14 | 9 | 9 | 9 | 9 | 12 |
| 3 day Yellowing Index | 13 | 14 | 16 | 17 | 14 | 15 | 32 | 26 | 17 | 14 | 19 | 27 | 25 |

Examples 1 to 4 and Comparative Examples 1 and 2 have Component a), b) and d) while Examples 5 to 9 and Comparative Examples 3 and 4 have Component a), b), c) and d). As learnt from Table 1, the antioxidant composition of present invention has sufficient fluidity under low working temperatures such as 10° C. and even 0° C. The antioxidant compositions in Comparative example 2 and 4 turn to solid state at low temperatures. Although the antioxidant compositions in Comparative example 1 and 3 have good fluidity at low temperatures but tends to move into water during drying step because hexane has a low boiling point, which leads to a much worse anti-oxidation performance of the antioxidant compositions in rubber resins.

Table 2 shows raw rubber samples using antioxidant composition of Comparative examples 1 to 4 have obvious change in Mooney viscosity and Yellowing index from day 0 to day 3. As a contrary, the yellowing index of the invented antioxidant compositions is less than 20 and the change of Mooney Viscosity of the invented antioxidant compositions is less than 10% no matter increase or decrease. As a conclusion, the liquid antioxidant composition of present invention is able to provide sufficient oxidation resistance without staining the raw rubbers.

The invention claimed is:

1. A liquid antioxidant composition, comprising:

a) 5% to 30% by weight of at least one aromatic amine-based antioxidant agent;

b) 20% to 70% by weight of at least one hindered phenol-based antioxidant agent;

c) 0% to 40% by weight of at least one phosphite-based antioxidant agent; and d) 20% to 40% by weight of at least one solvent having boiling point higher than 185° C. and freezing point lower than −10° C. under 101.325 KPa, wherein the weight percentage of component a), b), c) or d) is based on the total weight of antioxidant composition, wherein the mixture of component a), b) and c) is liquid at 25° C. under 101.325 KPa, wherein said solvent is at least one selected from the group consisting of linear or branched alkane having $C_9$ to $C_{30}$, arene having $C_6$ to $C_{18}$, cyclane having $C_{10}$ to $C_{30}$, linear saturated carboxylic acid having $C_8$ to $C_{18}$, branched saturated carboxylic acid having $C_8$ to $C_{12}$, linear saturated alcohol having $C_8$ to $C_{18}$ and branched saturated alcohol having $C_8$ to $C_{12}$, alkyl-substituted phosphonic acid having $C_6$ to $C_{12}$, saturated or unsaturated monobasic aromatic acid ester having Formula I:

Formula I

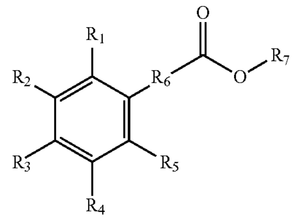

wherein, $R_1$ to $R_5$ are independently selected from hydrogen, saturated or unsaturated linear or branched alkyl groups having $C_1$ to $C_{15}$; $R_6$ is selected from saturated or unsaturated linear or branched alkylene groups having $C_1$ to $C_{15}$ or represents a covalent bond; $R_7$ is selected from saturated or unsaturated linear or branched alkyl groups having $C_1$ to $C_{15}$, and saturated or unsaturated dibasic aromatic acid ester having Formula II-(a) and/or Formula II-(b) and/or Formula II-(c):

Formula II-(a)

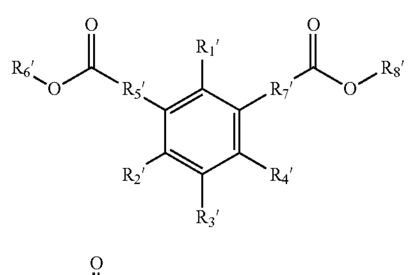

Formula II-(b)

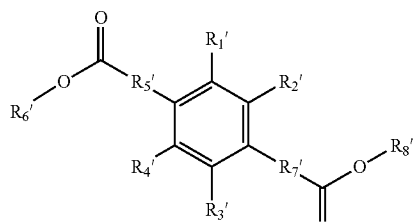

Formula II-(c)

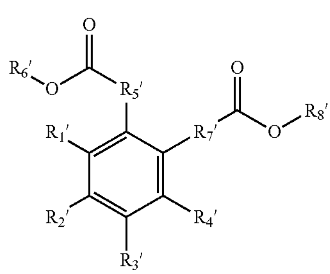

wherein, $R_1'$ to $R_4'$ are independently selected from hydrogen, saturated or unsaturated linear or branched alkyl groups having $C_1$ to $C_{15}$; $R_5'$ and $R_7'$ are independently selected from saturated or unsaturated linear or branched alkylene groups having $C_1$ to $C_{15}$ or represents a covalent bond; $R_6'$ and $R_8'$ are independently selected from saturated or unsaturated linear or branched alkyl groups having $C_1$ to $C_{15}$, and saturated or unsaturated tribasic aromatic acid ester having Formula III-(a) and/or Formula III-(b) and/or Formula III-(c):

Formula III-(a)

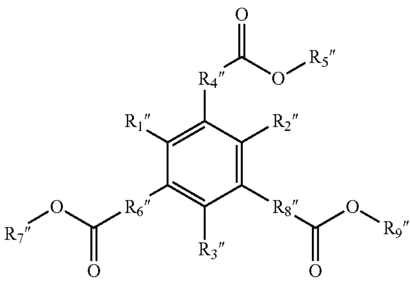

Formula III-(b)

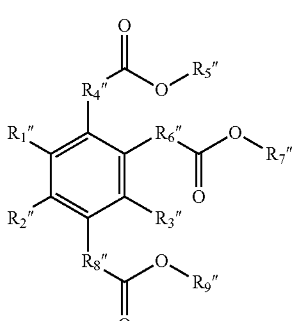

Formula III-(c)

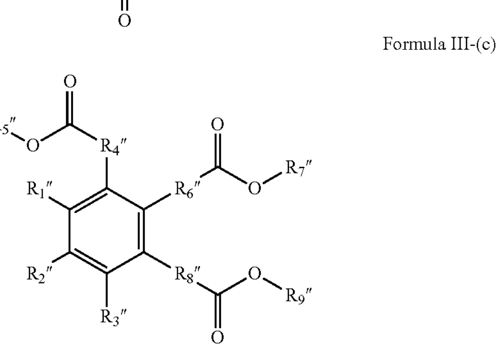

wherein, $R_1''$ to $R_3''$ are independently selected from hydrogen, saturated or unsaturated linear or branched alkyl groups having $C_1$ to $C_{15}$; $R_4''$, $R_6''$ and $R_8''$ are independently selected from saturated or unsaturated linear or branched alkylene groups having $C_1$ to $C_{15}$ or represents a covalent bond; $R_5''$, $R_7''$ and $R_9''$ are independently selected from saturated or unsaturated linear or branched alkyl groups having $C_1$ to $C_{15}$, and alkylated phosphate having Formula IV:

Formula IV

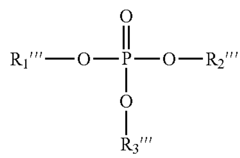

wherein, $R_1'''$ to $R_3'''$ are independently selected from hydrogen, saturated or unsaturated linear or branched alkyl groups having $C_1$ to $C_{15}$, and saturated or unsaturated monobasic carboxylic acid ester having Formula V:

Formula V

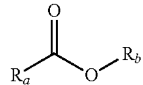

wherein, $R_a$ and $R_b$ are independently selected from saturated or unsaturated linear or branched alkyl groups having $C_1$ to $C_{15}$, and saturated or unsaturated dibasic carboxylic acid ester having Formula VI:

Formula VI

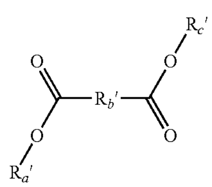

wherein, $R_a'$ and $R_c'$ are independently selected from saturated or unsaturated linear or branched alkyl groups having $C_1$ to $C_{15}$; $R_b'$ is selected from saturated or unsaturated linear or branched alkylene groups having $C_1$ to $C_{15}$, and saturated or unsaturated tribasic carboxylic acid ester having Formula VII:

Formula VII

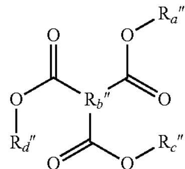

wherein, $R_a''$, $R_c''$ and $R_d''$ are independently selected from saturated or unsaturated linear or branched alkyl groups having $C_1$ to $C_{15}$; $R_b''$ is selected from saturated or unsaturated linear or branched alkylidene groups having $C_1$ to $C_{15}$.

2. The antioxidant composition according to claim 1, wherein said aromatic amine-based antioxidant agent is at least one selected from the group consisting of N,N'-di-sec-butyl-1,4-phenylenediamine, N-phenylbenzenamine reaction products with 2,4,4-trimethylpentene, bis(4-octylphenyl)amine, 4,4'-bis($\alpha$,$\alpha$-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and N,N'-bis(methyl-phenyl)-1,4-benzendiamine.

3. The antioxidant composition according to claim 1, wherein said hindered phenol-based antioxidant agent is at least one selected from the group consisting of poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, 2,4-bis[(dodecylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl) propionate), triethylene glycol-bis[3-(3-tert-butyl-5-methyl-4-hydroxyphenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, and 2,2-thiodiethylene bis[3-(3,5-di-tert-butyl-4-hydroxyphenyl) propionate].

4. The antioxidant composition according to claim 1, wherein said phosphite-based antioxidant agent is at least one selected from the group consisting of diphenyl-mono (2-ethylhexyl)phosphite, diphenyl-monotridecyl-phosphite, diphenyl-isodecylphosphite, diphenyl-isooctyl-phosphite, diphenyl-nonylphenyl-phosphite, triphenyl phosphite, triisodecyl phosphite, tris(2-ethylhexyl)phosphite, tetraphenyltetra(tridecyl)pentaerythritol tetraphosphite, 1,1,3-tris(2-methyl-4-di-tridecylphosphite-5-tert-butylphenyl)butane, 4,4'-butylidene bis(3-methyl-6-tert-butyl-di-tridecyl phosphite), 2,2'-ethylidene bis(4,6-di-tert-butyl-phenol)fluorophosphite, 4,4'-isopropylidene-diphenyl alkyl ($C_{12}$ to $C_{15}$) phosphites, bis(nonylphenyl)pentaerythritol diphosphite, hydrogenated bisphenol A-pentaerythritol phosphite polymers, 3,9-bis(octadecyloxy)-2,4,8,10-tetraoxa-3,9-diphosphaspiro[5.5]undecane, tetra-C12-15-alkyl(propane-2,2-diylbis(4,1-phenylene))bis(phosphite), 2-ethylhexyldiphenyl phosphite, tris((mono and di)-nonylphenyl)phosphite, tri-(2,4-di-tert-butylphenyl)phosphite, tetraphenyl dipropylene glycol diphosphite, and distearyl-pentaerythritoldiphosphite.

5. A liquid antioxidant composition, comprising:

a) 5% to 20% by weight of solid aromatic amine-based antioxidant agent;

b) 20% to 50% by weight of solid hindered phenol-based antioxidant agent;

c) 0% to 30% by weight of solid phosphite-based antioxidant agent; and d) 30% to 40% by weight of solvent having boiling point higher than 185° C. and freezing point lower than −10° C. under 101.325 KPa, wherein the weight percentage of component a), b), c) or d) is based on the total weight of antioxidant composition, wherein the mixture of component a), b) and c) is liquid at 25° C. under 101.325 KPa, wherein said solvent is at least one selected from the group consisting of linear or branched alkane having $C_9$ to $C_{30}$, arene having $C_6$ to $C_{18}$, cyclane having $C_{10}$ to $C_{30}$, linear saturated carboxylic acid having $C_8$ to $C_{18}$, branched saturated carboxylic acid having $C_8$ to $C_{12}$, linear saturated alcohol having $C_8$ to $C_{18}$ and branched saturated alcohol having $C_8$ to $C_{12}$, alkyl-substituted phosphonic acid having $C_6$ to $C_{12}$, saturated or unsaturated monobasic aromatic acid ester having Formula I:

Formula I

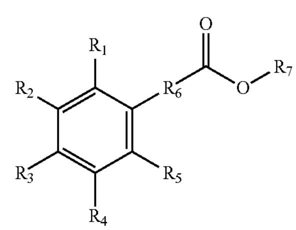

wherein, $R_1$ to $R_5$ are independently selected from hydrogen, saturated or unsaturated linear or branched alkyl groups having $C_1$ to $C_{15}$, $R_6$ is selected from saturated or unsaturated linear or branched alkylene groups having $C_1$ to $C_{15}$ or represents a covalent bond; $R_7$ is selected from saturated or unsaturated linear or branched alkyl groups having $C_1$ to $C_{15}$, and saturated or unsaturated dibasic aromatic acid ester having Formula II-(a) and/or Formula II-(b) and/or Formula II-(c):

Formula II-(a)

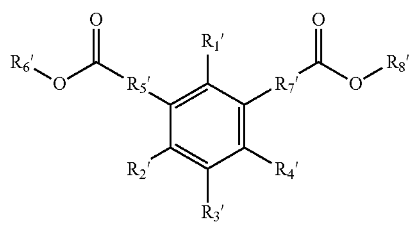

Formula II-(b)

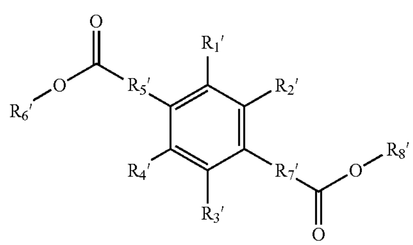

Formula II-(c)

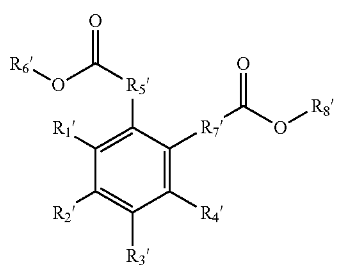

wherein, $R_1'$ to $R_4'$ are independently selected from hydrogen, saturated or unsaturated linear or branched alkyl groups having $C_1$ to $C_{15}$; $R_5'$ and $R_7'$ are independently selected from saturated or unsaturated linear or branched alkylene groups having $C_1$ to $C_{15}$ or represents a covalent bond; $R_6'$ and $R_8'$ are independently selected from saturated or unsaturated linear or branched alkyl groups having $C_1$ to $C_{15}$, and saturated or unsaturated tribasic aromatic acid ester having Formula III-(a) and/or Formula III-(b) and/or Formula III-(c):

Formula III-(a)

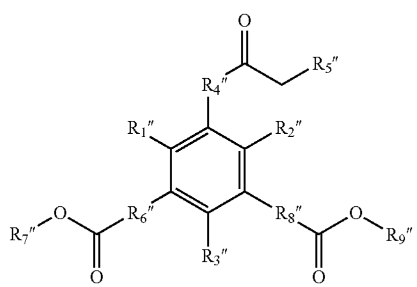

-continued

Formula III-(b)

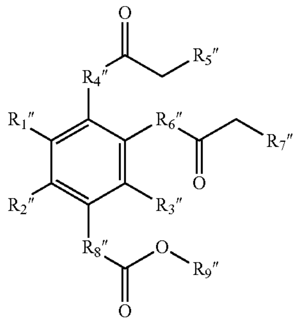

Formula III-(c)

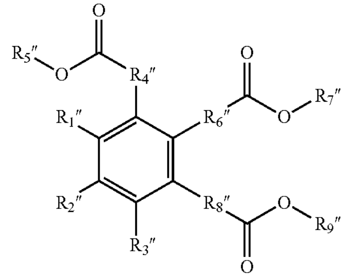

wherein, $R_1''$ to $R_3''$ are independently selected from hydrogen, saturated or unsaturated linear or branched alkyl groups having $C_1$ to $C_{15}$; $R_4''$, $R_6''$ and $R_8''$ are independently selected from saturated or unsaturated linear or branched alkylene groups having $C_1$ to $C_{15}$ or represents a covalent bond; $R_5''$, $R_7''$ and $R_9''$ are independently selected from saturated or unsaturated linear or branched alkyl groups having $C_1$ to $C_{15}$, and alkylated phosphate having Formula IV:

Formula IV

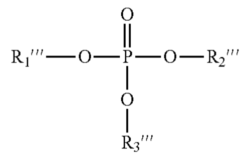

wherein, $R_1'''$ to $R_3'''$ are independently selected from hydrogen, saturated or unsaturated linear or branched alkyl groups having $C_1$ to $C_{15}$, and saturated or unsaturated monobasic carboxylic acid ester having Formula V:

Formula V

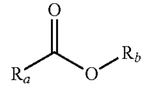

wherein, $R_a$ and $R_b$ are independently selected from saturated or unsaturated linear or branched alkyl groups having $C_1$ to $C_{15}$, and saturated or unsaturated dibasic carboxylic acid ester having Formula VI:

Formula VI

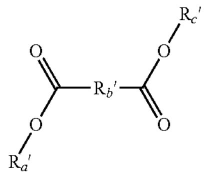

wherein, $R_a'$ and $R_c'$ are independently selected from saturated or unsaturated linear or branched alkyl groups having $C_1$ to $C_{15}$; $R_b'$ is selected from saturated or unsaturated linear or branched alkylene groups having $C_1$ to $C_{15}$, and saturated or unsaturated tribasic carboxylic acid ester having Formula VII:

Formula VII

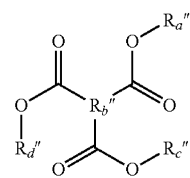

wherein, $R_a''$, $R_c''$ and $R_d''$ are independently selected from saturated or unsaturated linear or branched alkyl groups having $C_1$ to $C_{15}$; $R_b''$ is selected from saturated or unsaturated linear or branched alkylidene groups having $C_1$ to $C_{15}$.

6. The antioxidant composition according to claim 5, wherein said solid aromatic amine-based antioxidant agent is at least one selected from the group consisting of bis(4-octylphenyl)amine, 4,4'-bis(α,α-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenediamine, N-1,3-dimethylbutyl-N'-phenyl-p-phenylenediamine, and N,N'-bis(methylphenyl)-1,4-benzendiamine.

7. The antioxidant composition according to claim 5, wherein said solid hindered phenol-based antioxidant agent is at least one selected from the group consisting of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl)propionate), triethylene glycol-bis[3-(3-tert-butyl-5-methyl-4-hydrophenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, and 2,2-thio-diethylene bis[3-(3,5-di-tert-butyl-4-hydroxyphenyl) propionate].

8. The antioxidant composition according to claim 5, wherein said solid phosphite-based antioxidant agent is at least one selected from the group consisting of tri-(2,4-di-tert-butylphenyl)phosphite, tetraphenyl dipropylene glycol diphosphite, distearylpentaerythritoldiphosphite and 3,9-bis(octadecyloxy)-2,4,8,10-tetraoxa-3,9-diphosphaspiro[5.5] undecane.

9. The antioxidant composition according to claim 5, wherein said solvent is at least one selected from the group consisting of hendecane, n-dodecane, 2-methylnonane, n-decane, benzene, toluene, ethylbenzene, propylbenzene, butylbenzene, pentylbenzene, hexylbenzene, heptylbenzene, octylbenzene, nonylbenzene, decylbenzene, undecylbenzene, dodecylbenzene, butylcyclohexane, pentylcyclohexane, hexylcyclohexane, heptylcyclohexane, octylcyclohexane, nonylcyclohexane, decylcyclohexane, undecylcyclohexane, dodecylcyclohexane, pentylcyclopentane, hexylcyclopentane, heptycyclopentane, octylcyclopentane, nonylcyclopentane, decylcyclopentane, undecylcyclopentane, dodecylclopentane, 2-ethylhexanoic acid, hexanoic acid, heptanoic acid, neo-decanoic acid, isononanoic acid, neodecanoic acid, n-octyl alcohol, n-nonanol, n-decyl alcohol, n-undecanol, isooctyl alcohol, isononyl alcohol, isodecyl alcohol, methyl benzoate, ethyl benzoate, propyl benzoate, butyl benzoate, hexyl benzoate, diethyl phthalate, dipropyl phthalate, dibutyl phthalate, dipentyl phthalate, dihexyl phthalate, diheptyl phthalate, dioctyl phthalate, diisooctyl phthalate, dinonyl phthalate, diisononyl phthalate, didecyl phthalate, diisodecyl phthalate, trimethyl orthobenzoate, ethyl oleate, butyl oleate, octyl acetate, decyl acetate, isononyl acetate, nonyl acetate, n-octyl propanoate, decyl propanoate, isononyl propanoate, nonyl propanoate, pentyl butanoate, hexyl butyrate, heptyl butanoate, n-octyl butanoate, butyl valerate, amyl valerate, hexyl valerate, butyl caproate, amyl caproate, hexyl hexanoate, ethyl heptanoate, propyl heptanoate, butyl heptanoate, pentyl heptanoate, methyl octanoate, etheyl octanoate, propyl octanoate, butyl octanoate, amyl octanoate, hexyl octanoate, heptyl octanoate, octyl octanoate, nonyl octanoate, methyl nonanoate, ethyl nonanoate, isoamyl nonanoate, isononyl isononanoate, methyl caprate, ethyl caprate, propyl decanoate, butyl caprate, isoamyl decanoate, lauric acid isoamyl ester, ethylene glycol diacetate, ethylene glycol di-n-butyrate, dibutyl malonate, diethyl malonate, dihexyl malonate, diethyl succinate, dipropyl succinate, dibutyl succinate, dipentyl succinate, dimethyl glutarate, diethyl glutarate, diethyl adipate, diisopropyl adipate, diisobutyl adipate, di(2-ethylhexyl)adipate, dihexyl adipate, diisononyl adipate, diisodecyl adipate, dibutyl sebacate, bishexyl sebacate, bis(2-ethylhexyl) sebacate, dioctyl sebacate, diisooctyl sebacate, glyceryl triacetate, glyceryl tripropionate, glyceryl tributyrate, triisobutyl phosphate, triamyl phosphate, trihexyl phosphate and trioctyl phosphate.

10. The antioxidant composition according to claim 5, wherein said solvent is at least one selected from the group consisting of paraffin oil, naphthenic oil, arene oil, n-dodecane, hexanoic acid, heptanoic acid, 2-ethylhexanoic acid, isononanoic acid, neodecanoic acid, n-nonanol, isodecyl alcohol, isooctyl alcohol, ethyl oleate and butyl oleate.

11. The antioxidant composition according to claim 5, wherein the freezing point of the antioxidant composition is lower than 0° C. under 101.325 KPa.

12. A process of using antioxidant composition according to claim 1 in raw rubbers synthesized via solution polymerization comprising:

i) dissolving component a), b) and c) into d);

ii) diluting liquid antioxidant composition by solvent for solution polymerization of raw rubbers; and iii) adding diluted liquid antioxidant composition into raw rubbers synthesized via solution polymerization.

13. A raw rubber product comprising the antioxidant composition according to claim 1.

14. The raw rubber product according to claim 13, wherein a yellowing index according to ASTM E313-1996 is less than 20.

15. The raw rubber product according to claim 13, wherein a Mooney viscosity change from 0 to 72 hours is less than 10% and the Mooney viscosity is tested according to ISO 289-1:1994.

16. The antioxidant composition according to claim 1, wherein said solvent is at least one selected from the group consisting of hendecane, n-dodecane, 2-methylnonane, n-decane, benzene, toluene, ethylbenzene, propylbenzene, butylbenzene, pentylbenzene, hexylbenzene, heptylbenzene, octylbenzene, nonylbenzene, decylbenzene, undecylbenzene, dodecylbenzene, butylcyclohexane, pentylcyclohexane, hexylcyclohexane, heptylcyclohexane, octylcyclohexane, nonylcyclohexane, decylcyclohexane, undecylcyclohexane, dodecylcyclohexane, pentylcyclopentane, hexylcyclopentane, heptycyclopentane, octylcyclopentane, nonylcyclopentane, decylcyclopentane, undecylcyclopentane, dodecylclopentane, 2-ethylhexanoic acid, hexanoic acid, heptanoic acid, neo-decanoic acid, isononanoic acid, neodecanoic acid, n-octyl alcohol, n-nonanol, n-decyl alcohol, n-undecanol, isooctyl alcohol, isononyl alcohol, isodecyl alcohol, methyl benzoate, ethyl benzoate, propyl benzoate, butyl benzoate, hexyl benzoate, diethyl phthalate, dipropyl phthalate, dibutyl phthalate, dipentyl phthalate, dihexyl phthalate, diheptyl phthalate, dioctyl phthalate, diisooctyl phthalate, dinonyl phthalate, diisononyl phthalate, didecyl phthalate, diisodecyl phthalate, trimethyl orthobenzoate, ethyl oleate, butyl oleate, octyl acetate, decyl acetate, isononyl acetate, nonyl acetate, n-octyl propanoate, decyl propanoate, isononyl propanoate, nonyl propanoate, pentyl butanoate, hexyl butyrate, heptyl butanoate, n-octyl butanoate, butyl valerate, amyl valerate, hexyl valerate, butyl caproate, amyl caproate, hexyl hexanoate, ethyl heptanoate, propyl heptanoate, butyl heptanoate, pentyl heptanoate, methyl octanoate, etheyl octanoate, propyl octanoate, butyl octanoate, amyl octanoate, hexyl octanoate, heptyl octanoate, octyl octanoate, nonyl octanoate, methyl nonanoate, ethyl nonanoate, isoamyl nonanoate, isononyl isononanoate, methyl caprate, ethyl caprate, propyl decanoate, butyl caprate, isoamyl decanoate, lauric acid isoamyl ester, ethylene glycol diacetate, ethylene glycol di-n-butyrate, dibutyl malonate, diethyl malonate, dihexyl malonate, diethyl succinate, dipropyl succinate, dibutyl succinate, dipentyl succinate, dimethyl glutarate, diethyl glutarate, diethyl adipate, diisopropyl adipate, diisobutyl adipate, di(2-ethylhexyl)adipate, dihexyl adipate, diisononyl adipate, diisodecyl adipate, dibutyl sebacate, bishexyl sebacate, bis(2-ethylhexyl) sebacate, dioctyl sebacate, diisooctyl sebacate, glyceryl triacetate, glyceryl tripropionate, glyceryl tributyrate, triisobutyl phosphate, triamyl phosphate, trihexyl phosphate and trioctyl phosphate.

17. The antioxidant composition according to claim 1, wherein said solvent is at least one selected from the group consisting of paraffin oil, naphthenic oil, arene oil, n-dodecane, hexanoic acid, heptanoic acid, 2-ethylhexanoic acid, isononanoic acid, neodecanoic acid, n-nonanol, isodecyl alcohol, isooctyl alcohol, ethyl oleate and butyl oleate.

* * * * *